(12) United States Patent
Ran et al.

(10) Patent No.: US 12,066,863 B2
(45) Date of Patent: Aug. 20, 2024

(54) FOLDABLE ELECTRONIC DEVICE

(71) Applicant: HUAWEI TECHNOLOGIES CO., LTD., Guangdong (CN)

(72) Inventors: Jianbo Ran, Shenzhen (CN); Wen Fan, Dongguan (CN); Chunjun Ma, Shanghai (CN); Tao Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 17/526,952

(22) Filed: Nov. 15, 2021

(65) Prior Publication Data

US 2022/0075415 A1 Mar. 10, 2022

Related U.S. Application Data

(63) Continuation of application No. PCT/CN2020/089914, filed on May 13, 2020.

(30) Foreign Application Priority Data

May 13, 2019 (CN) .......................... 201910395424.5

(51) Int. Cl.
 *G06F 1/16* (2006.01)
(52) U.S. Cl.
 CPC .......... *G06F 1/1641* (2013.01); *G06F 1/1616* (2013.01); *G06F 1/1652* (2013.01)
(58) Field of Classification Search
 CPC ..... G06F 1/1616; G06F 1/1641; G06F 1/1652
 See application file for complete search history.

(56) References Cited

U.S. PATENT DOCUMENTS

| 9,204,565 | B1 | 12/2015 | Lee et al. |
| 9,235,239 | B2 | 1/2016 | Van Dijk et al. |
| 2008/0174942 | A1* | 7/2008 | Yang ................... H04M 1/0235 439/165 |
| 2010/0039350 | A1* | 2/2010 | Wakefield ............. G06F 1/1684 345/1.3 |

(Continued)

FOREIGN PATENT DOCUMENTS

| CN | 103514809 A | 1/2014 |
| CN | 103582340 A | 2/2014 |

(Continued)

*Primary Examiner* — Anthony Q Edwards
(74) *Attorney, Agent, or Firm* — HUAWEI TECHNOLOGIES CO., LTD.

(57) ABSTRACT

A foldable electronic device, including: a foldable screen, where the foldable screen is made of a plurality of layers of materials; and a first housing and a second housing, where the first housing and the second housing are connected by using a folding shaft, traction mechanisms are disposed on the first housing and the second housing, an outermost layer of the foldable screen is fixedly connected to the first housing and the second housing, an innermost layer of the foldable screen is fixedly connected to the traction mechanisms, the traction mechanisms slide on the first housing and the second housing along a first direction, the traction mechanisms are configured to drag the layers of the foldable screen to be dislocated mutually, and the first direction is a direction perpendicular to the folding shaft.

9 Claims, 15 Drawing Sheets

(56) References Cited

U.S. PATENT DOCUMENTS

| | | | |
|---|---|---|---|
| 2013/0010405 A1* | 1/2013 | Rothkopf | H05K 5/0226 |
| | | | 361/679.01 |
| 2014/0029171 A1* | 1/2014 | Lee | H04M 1/0268 |
| | | | 361/679.01 |
| 2016/0195902 A1 | 7/2016 | Huh et al. | |
| 2017/0054105 A1 | 2/2017 | Alonso et al. | |
| 2017/0160769 A1 | 6/2017 | Xu | |
| 2017/0285691 A1 | 10/2017 | Baek | |
| 2017/0315588 A1* | 11/2017 | Aurongzeb | G06F 1/1601 |
| 2017/0357289 A1 | 12/2017 | Ahn | |
| 2018/0284839 A1 | 10/2018 | Lin | |
| 2018/0324964 A1* | 11/2018 | Yoo | H01Q 1/2266 |
| 2022/0140263 A1* | 5/2022 | Liu | G06F 3/041 |
| | | | 361/679.56 |
| 2023/0350533 A1* | 11/2023 | Kim | G06F 1/1652 |

FOREIGN PATENT DOCUMENTS

| | | |
|---|---|---|
| CN | 104425320 A | 3/2015 |
| CN | 104898784 A | 9/2015 |
| CN | 105549689 A | 5/2016 |
| CN | 105652975 A | 6/2016 |
| CN | 106328007 A | 1/2017 |
| CN | 106559529 A | 4/2017 |
| CN | 106788536 A | 5/2017 |
| CN | 107071096 A | 8/2017 |
| CN | 107564423 A | 1/2018 |
| CN | 107924212 A | 4/2018 |
| CN | 208314628 U | 1/2019 |
| CN | 208596508 U | 3/2019 |
| CN | 109600469 A | 4/2019 |
| CN | 208689844 U | 4/2019 |
| CN | 209982520 U | 1/2020 |
| CN | 110809073 A | 2/2020 |
| CN | 210670850 U | 6/2020 |
| KR | 20080028134 A | 3/2008 |
| KR | 20100104078 A | 9/2010 |
| KR | 20140014669 A | 2/2014 |

\* cited by examiner

FOLDABLE ELECTRONIC DEVICE

CROSS-REFERENCE TO RELATED APPLICATIONS

This application is a continuation of International Application No. PCT/CN2020/089914, filed on May 13, 2020, which claims priority to Chinese Patent Application No. 201910395424.5, filed on May 13, 2019. The disclosures of the aforementioned applications are hereby incorporated by reference in their entireties.

TECHNICAL FIELD

This application relates to the field of electronic devices, and more specifically, to a foldable electronic device.

BACKGROUND

A foldable screen is formed by stacking a plurality of layers of materials together through gluing, and has a specific thickness. Currently, after a foldable screen of an electronic device is folded for a plurality of times, corrugation occurs on a part of the foldable screen, and long-time corrugation causes a phenomenon that adhesive glue between the layers of the foldable screen is fatigued and detached and the screen is arched. Consequently, normal use of a user is severely affected. How to avoid the arching of the foldable screen and detachment between the layers becomes an urgent problem to be solved in the industry.

SUMMARY

This application provides a foldable electronic device. In a process of folding a foldable screen, traction mechanisms disposed on housings proactively drag an innermost layer of the foldable screen to slide along a folding direction. This assists the foldable screen in dislocation of layers of the screen in the folding process and motion along the folding direction, so that corruption and arching of a part of the screen that occur in the screen folding process can be avoided.

According to a first aspect, a foldable electronic device is provided, including: a foldable screen, where the foldable screen is made of a plurality of layers of materials: and a first housing and a second housing, where the first housing and the second housing are connected by using a folding shaft, traction mechanisms are disposed on the first housing and the second housing, an outermost layer of the foldable screen is fixedly connected to the first housing and the second housing, an innermost layer of the foldable screen is fixedly connected to the traction mechanisms, the traction mechanisms slide on the first housing and the second housing along a first direction, the traction mechanisms are configured to drag the layers of the foldable screen to be dislocated mutually, and the first direction is a direction perpendicular to the folding shaft.

According to the electronic device provided in the first aspect, in a process of folding the foldable screen, the traction mechanisms disposed on the housings proactively drag the innermost layer of the foldable screen to slide along a folding direction, and the outermost layer of the foldable screen is fixedly connected to the housing. This can release a degree of freedom of the foldable screen along the folding direction, assist the foldable screen in dislocation of the layers of the screen in the folding process and motion along the folding direction, avoid arching and detachment between the layers of the screen that occur after the screen is folded for a plurality of times, and resolve a problem that the screen is not flat after the screen is folded for a plurality of times. In this way, user experience is improved.

In a possible implementation of the first aspect, the foldable screen includes a cover layer and a display layer, the cover layer is the outermost layer of the foldable screen, the display layer is the innermost layer of the foldable screen, and both the cover layer and the display layer are made of a plurality of layers of materials.

In a possible implementation of the first aspect, the display layer includes a folding region, a first display region, and a second display region, the first display region and the second display region are located on two sides of the folding region, and the folding region corresponds to the folding shaft. The electronic device further includes: a first screen reinforcement sheet, where the first screen reinforcement sheet is fixedly connected to an innermost layer of the first display region, the first screen reinforcement sheet is configured to enhance strength of the first display region, and the traction mechanism on the first housing is fixedly connected to the first screen reinforcement sheet: and a second screen reinforcement sheet, where the second screen reinforcement sheet is fixedly connected to an innermost layer of the second display region, the second screen reinforcement sheet is configured to enhance strength of the second display region, and the traction mechanism on the second housing is fixedly connected to the second screen reinforcement sheet. In this implementation, the screen reinforcement sheets are first fastened to the innermost sides of the first display region and the second display region, and then the display layer is fixedly connected to the traction mechanisms by using the screen reinforcement sheets. The traction mechanisms are not in direct contact with the innermost side of the display layer, but are in contact with and fixedly connected to a screen reinforcement sheet with higher rigidity. This can improve an effect that, in a process of folding the foldable screen, the traction mechanisms are used to drag the layers of the foldable screen to be dislocated on the housing along a first direction, and enhance efficiency of dislocation of the layers of the screen in the process of folding the foldable screen and efficiency of motion along the folding direction.

In a possible implementation of the first aspect, the display layer includes a folding region, a first display region, and a second display region, the first display region and the second display region are located on two sides of the folding region, the folding region corresponds to the folding shaft, a first screen reinforcement sheet is fixedly connected to the traction mechanism on the first housing, a second screen reinforcement sheet is fixedly connected to the traction mechanism on the second housing, the first screen reinforcement sheet is fixedly connected to an innermost layer of the first display region, the first screen reinforcement sheet is configured to enhance strength of the first display region, the second screen reinforcement sheet is fixedly connected to an innermost layer of the second display region, and the second screen reinforcement sheet is configured to enhance strength of the second display region.

In a possible implementation of the first aspect, the traction mechanism on the first housing and the first screen reinforcement sheet are integrally formed, and the traction mechanism on the second housing and the second screen reinforcement sheet are integrally formed.

In a possible implementation of the first aspect, a screen strengthening sheet is fixedly connected to the innermost layer of the foldable screen, and the first screen reinforcement sheet and the second screen reinforcement sheet are fixedly connected to the screen strengthening sheet.

In a possible implementation of the first aspect, clamping slots are disposed on the first housing and the second housing, the traction mechanism includes a sliding block, the sliding block is disposed in the clamping slot, the sliding block slides in the clamping slot along the first direction, and the sliding block is fixedly connected to the innermost layer of the foldable screen, or the sliding block is fixedly connected to the first screen reinforcement sheet or the second screen reinforcement sheet. In an implementation manner, it is easy to implement the traction mechanisms by using the sliding blocks. In this way, complexity is comparatively low; and costs of the traction mechanisms are further reduced.

In a possible implementation of the first aspect, the traction mechanism is a swing lever traction mechanism, one end of the swing lever traction mechanism is connected to the folding shaft, and the other end of the swing lever traction mechanism is fixedly connected to the innermost layer of the foldable screen, or the other end of the swing lever traction mechanism is fixedly connected to the first screen reinforcement sheet or the second screen reinforcement sheet.

In a possible implementation of the first aspect, driving mechanisms are disposed on the first housing and the second housing, and the driving mechanisms are configured to drive the traction mechanisms to slide on the first housing and the second housing along the first direction.

In a possible implementation of the first aspect, the driving mechanism may include a shift lever (which may also be referred to as a shift lever apparatus), the traction mechanism may include at least two shift sheets, the shift lever is located between any two shift sheets, and the shift lever is configured to push the traction mechanism to slide.

In a possible implementation of the first aspect, the driving mechanism is a spring, and the folding shaft and the traction mechanisms are connected by using the springs.

In a possible implementation of the first aspect, the traction mechanism may be any one of a sliding sheet, a gear, a butterfly-shaped sheet, or an eccentric wheel.

In a possible implementation of the first aspect, the driving mechanism may be any one of a motor, a spring, or a folding shaft used to connect the housings.

According to the foldable electronic device provided in this application, in a process of folding the foldable screen, the traction mechanisms disposed on the housings proactively drag the innermost layer of the foldable screen to slide along the folding direction, and the outermost layer of the foldable screen is fixedly connected to the housing, and is immobile compared with the housings. This can release a degree of freedom of the foldable screen along the folding direction, assist the foldable screen in dislocation of the layers of the screen in the folding process and motion along the folding direction, avoid corrugation and arching of a part of the screen that occur when the screen is folded, avoid detachment between the layers of the screen that occurs after the screen is folded for a plurality of times, and resolve a problem that the screen is not flat after the screen is folded for a plurality of times.

DESCRIPTION OF EMBODIMENTS

The following describes technical solutions of this application with reference to accompanying drawings.

A foldable electronic device in the embodiments of this application may include a terminal device having a foldable screen, for example, user equipment, an access terminal, a subscriber unit, a subscriber station, a mobile station, a mobile console, a remote station, a remote terminal, a mobile device, a user terminal, a wireless communications device, a user agent, or a user apparatus that has a foldable screen. For example, the foldable electronic device may alternatively be a foldable mobile phone, a foldable tablet computer, a foldable notebook computer, a foldable cellular phone, a cordless telephone, a session initiation protocol (session initiation protocol, SIP) telephone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. A specific form of the foldable electronic device is not limited in the embodiments of this application.

Figure 1:
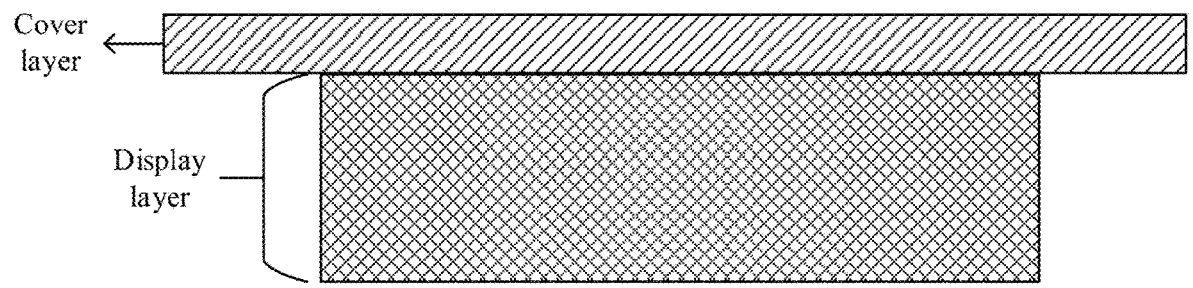
FIG. 1 is a schematic diagram of a side-view structure of a foldable screen according to this application.

With gradual development of materials science and technologies, a technology of foldable screens is becoming more mature. A foldable screen is a flexible display screen that can be folded. Because the foldable screen is formed by stacking a plurality of layers of materials through gluing, the foldable screen has a particular thickness. FIG. 1 is a schematic diagram of a side-view structure of a foldable screen. As shown in FIG. 1, the foldable screen mainly includes a cover layer (CL) and a display layer. The display layer (which may also be referred to as a display module assembly) is mainly used to display content or information such as an image or text to a user. The display layer has a specific thickness, and the display layer may also be referred to as an organic light-emitting diode (organic light-emitting diode, OLED) layer. The cover layer (which may also be referred to as a flexible cover layer) is mainly used to protect the display layer from being worn, damaged, or the like, and avoid direct contact between the display layer and a user. The cover layer is mainly used to prolong a service life of the display layer. The cover layer also has a specific thickness. The cover layer is located at an outermost layer of the foldable screen, that is, a layer that can be touched by the user. The display layer and the cover layer are fixedly glued together by using an optical adhesive or the like, and the display layer is located at an inner layer of the foldable screen. Dimensions of the cover layer are greater than those of the display layer. Both the cover layer and the display layer are made of a plurality of layers of materials.

Figure 2:
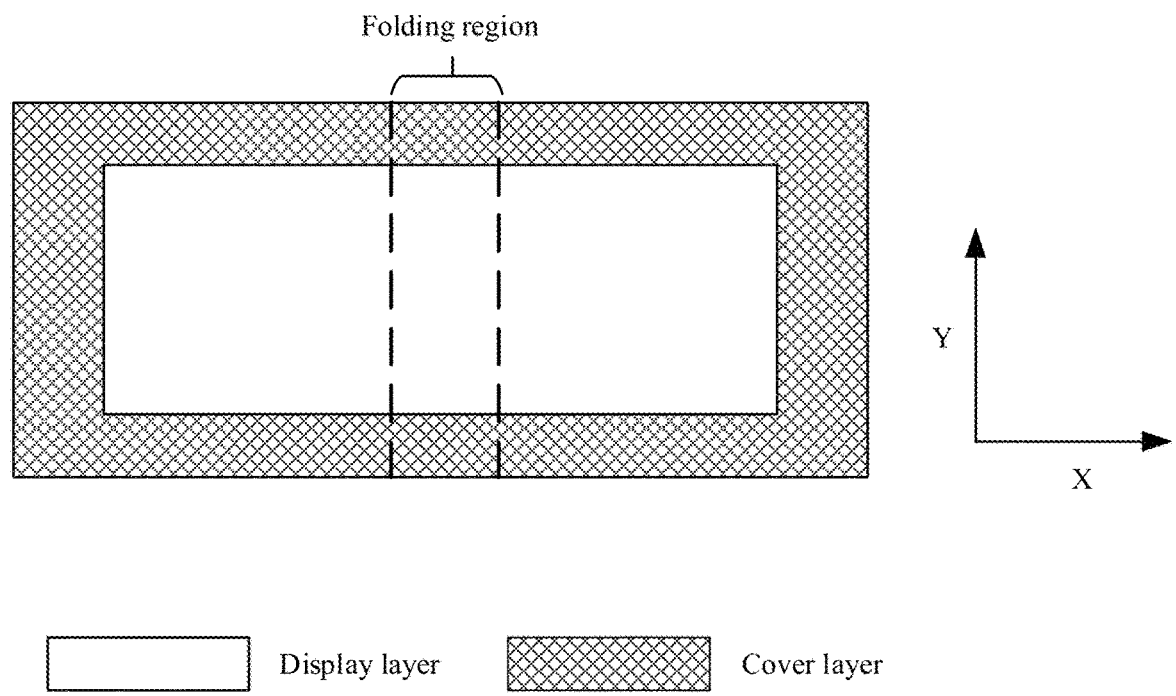
FIG. 2 is a schematic diagram of a main-view structure of a foldable screen according to this application.
Figure 3:
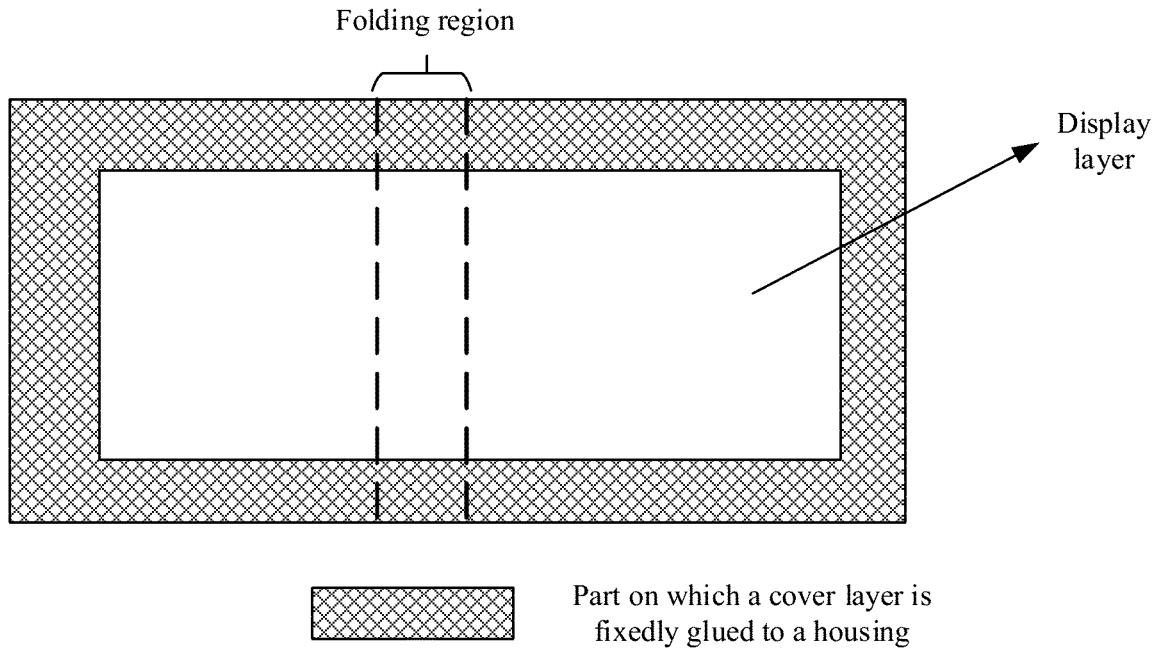
FIG. 3 is a schematic diagram of an example of a position in which a cover layer is fixedly attached to a housing according to this application.

FIG. 2 is a schematic diagram of a main-view structure of the foldable screen. As shown in FIG. 2, an area of the cover layer is greater than that of the display layer, and the cover layer is located at the outermost layer (an uppermost layer) of the screen. The display layer is located below the cover layer. Relative to the display layer, the cover layer has an extra area. That is, in an X-axis direction and a Y-axis direction, dimensions of the cover layer are greater than those of the display layer. The extra area of the cover layer relative to the dimensions of the display layer is used to be fixedly connected to a housing (which may also be referred to as a middle frame) (for example, is attached to the housing). A folding region in FIG. 2 is a bending region present when the foldable screen is folded. FIG. 3 is a schematic diagram of a position in which the cover layer is fixedly attached to the housing. It can be learned that only a circumferential part of the cover layer is fixedly attached to the housing. There is a folding region on the foldable screen, and the foldable screen is bent mainly in the folding region.

Figure 4:
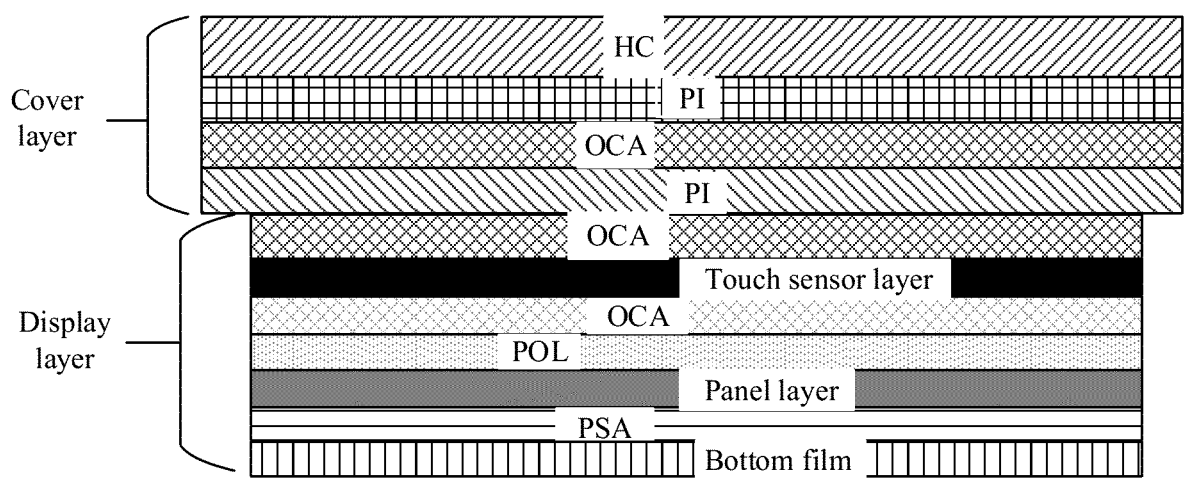
FIG. 4 is a schematic diagram of an example of material composition of a cover layer and a display layer according to this application.

Both the cover layer and the display layer are formed by stacking a plurality of layers of materials (for example, through gluing). FIG. 4 is a schematic diagram of an example of material composition of a cover layer and a display layer according to this application. As shown in FIG. 4, the cover layer may be formed by sequentially stacking a hardened case (hardened case, HC), a polyimide (Polyimide, PI) layer, an optically clear adhesive (optically clear adhesive, OCA), and a PI layer. The display layer may be formed by sequentially stacking an OCA, a touch sensor (touch sensor) layer, an OCA, a polarizer (polarizer, POL) layer, a panel layer (panel) OCA, a pressure sensitive adhesive (pressure sensitive adhesive, PSA), and a bottom film (bottom film) layer. The bottom film may be made of a PI material.

Figure 5:
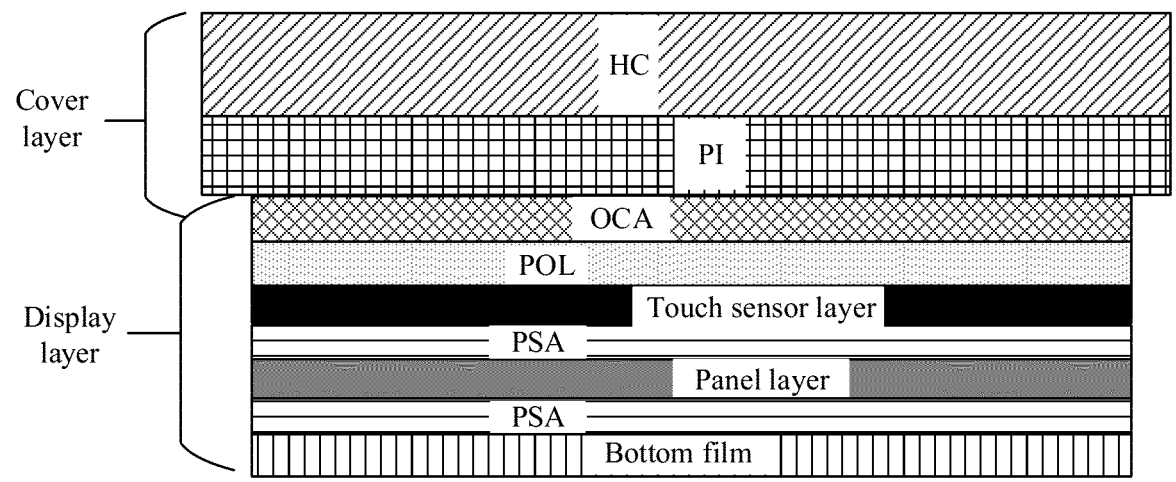
FIG. 5 is a schematic diagram of another example of material composition of a cover layer and a display layer according to this application.

FIG. 5 is a schematic diagram of another example of material composition of a cover layer and a display layer according to this application. As shown in FIG. 5, the cover layer may be formed by sequentially stacking an HC and a PI layer. The display layer may be formed by sequentially stacking an OCA, a POL, a touch sensor (touch sensor) layer, a PSA, a panel layer (panel), a PSA, and a bottom film (bottom film) layer. The touch sensor layer may be made of conductive glass ITO. The bottom film layer may be made of a PI material.

Figure 6:
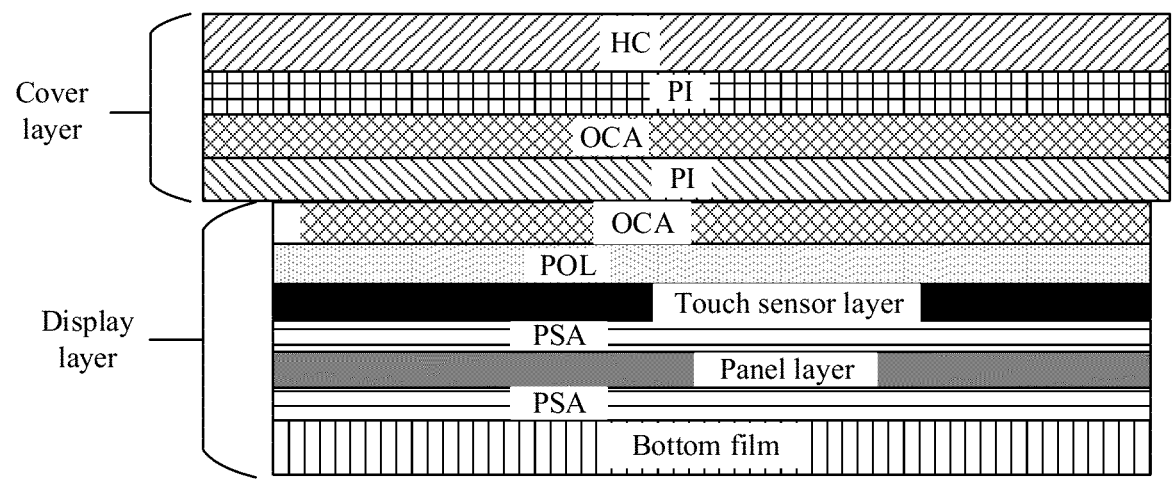
FIG. 6 is a schematic diagram of still another example of material composition of a cover layer and a display layer according to this application.

FIG. 6 is a schematic diagram of another example of material composition of a cover layer and a display layer according to this application. As shown in FIG. 6, the cover layer may be formed by sequentially stacking an HC, a PI layer, an OCA, and a PI layer. The display layer may be formed by sequentially stacking an OCA, a POL, a touch sensor (touch sensor) layer, a PSA, a panel layer (panel), a PSA, and a bottom film (bottom film) layer. The touch sensor layer may be made of conductive glass ITO. The bottom film may be made of a PI material.

It should be understood that what are shown in FIG. 4 to FIG. 6 are merely examples, and composition of the cover layer and the display layer and a stacking (gluing) order of all the layers of materials shall not be limited. For example, all the layers of materials of the display layer or the cover layer may be stacked in another order. Alternatively, the display layer or the cover layer may be formed by stacking more layers of materials, and a stacking order of the layers of materials may be any possible order or the like. For another example, the foldable screen is not limited to being divided into the cover layer and the display layer, and may further include another layer or the like. In this application, no limitation is imposed on composition materials of the display layer and the cover layer, a material stacking order, and division into a plurality of layers of the foldable screen.

Figure 7:
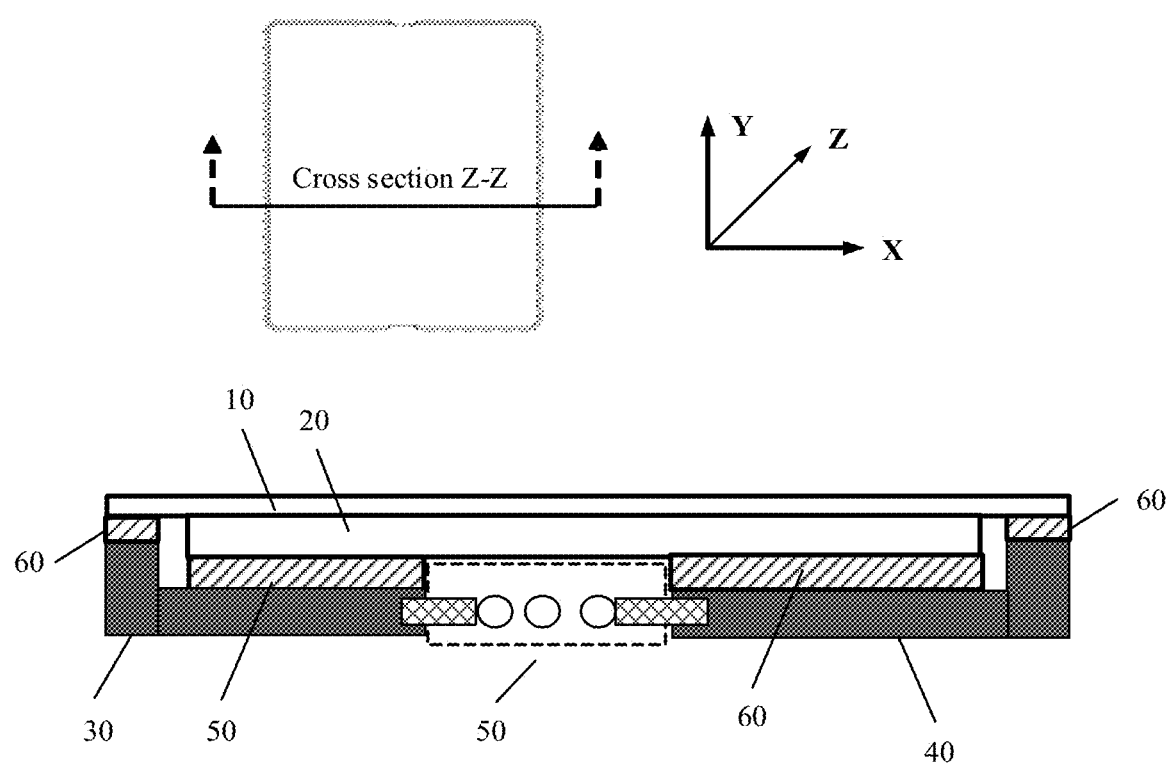
FIG. 7 is a schematic structural diagram of an example in which a foldable screen of an electronic device is in an unfolded state.

Currently, the foldable screen is mainly fastened to the housing of the electronic device by using an adhesive or through glue dispersing. FIG. 7 is a schematic structural diagram of an example in which the foldable screen of the electronic device is in an unfolded state. As shown in FIG. 7, the foldable screen of the electronic device is in the unfolded state. If the foldable screen is cut along a cross section Z-Z, a sectional view of a structure shown in FIG. 7 is obtained, and a Z-axis direction is a thickness direction of the electronic device. The cover layer 10 may be considered as an outer layer of the foldable screen, and the display layer 20 may be considered as an inner layer of the foldable screen. In a process of folding the foldable screen, the foldable screen is folded along a rotating shaft (which may also be referred to as a folding shaft) 50. The rotating shaft 50 divides the housing into a first housing 30 and a second housing 40. The first housing 30 and the second housing 40 are located on two sides of the rotating shaft, respectively. A periphery of the cover layer 10 is fixedly glued to the first housing 30 and the second housing 40 by using an adhesive 60. An innermost side of the display layer 20 is fixedly glued to the first housing 30 and the second housing 40 by using an adhesive 60. As shown in FIG. 7, both the outer layer (the cover layer 10) and the inner layer (the display layer 20) of the foldable screen are fixedly connected to the housing.

Figure 8:
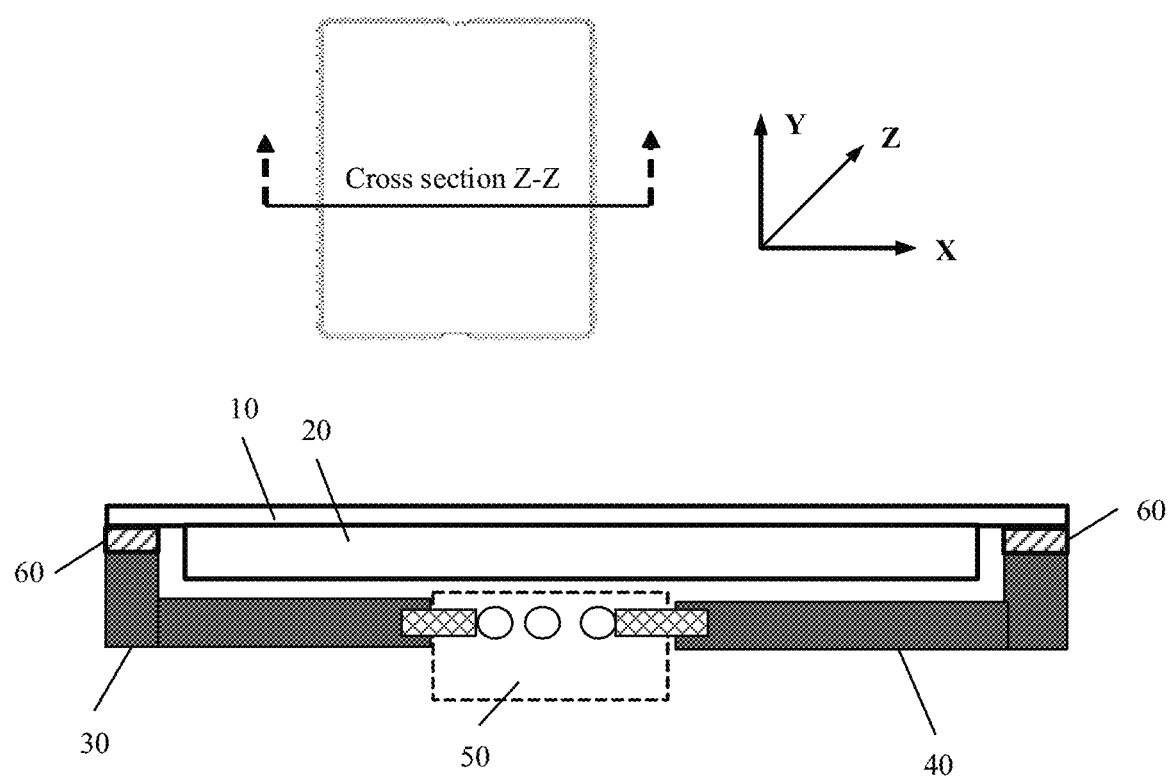
FIG. 8 is a schematic structural diagram of another example in which a foldable screen of an electronic device is in an unfolded state.

FIG. 8 is a schematic structural diagram of another example in which the foldable screen of the electronic device is in an unfolded state. As shown in FIG. 8, the foldable screen of the electronic device is in an unfolded state, and a Z-axis direction is a thickness direction of the electronic device. If the foldable screen is cut along a cross section Z-Z, a sectional view of a structure shown in FIG. 8 is obtained. As shown in FIG. 8, a periphery of the cover layer 10 is fixedly glued to the first housing 30 and the second housing 40 by using an adhesive 60. The display layer 20 is not connected to the first housing 30 or the second housing. That is, only the outer layer (the cover layer 10) of the foldable screen is fixedly connected to the housing.

Figure 9:
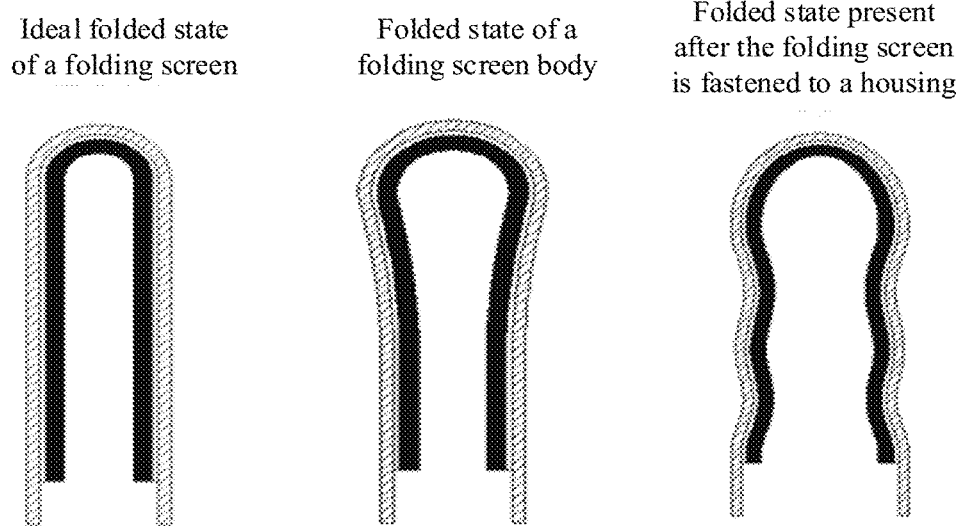
FIG. 9 is a schematic diagram of an example of dislocation of layers of a screen that occurs when the foldable screen is folded.

FIG. 9 is a schematic diagram of dislocation of layers of the screen that occurs when the foldable screen is folded. In FIG. 9, an example in which the foldable screen has two layers is used for description. It should be understood that a quantity of layers forming the foldable screen shall not be limited in FIG. 9. A leftmost diagram in FIG. 9 is a schematic diagram of an ideal folded state of the foldable screen. It can be learned that no corrugation or arching occurs on the entire foldable screen, and the layers of the screen can be dislocated freely in the folding process. A middle diagram of FIG. 9 is a schematic diagram of an actual folded state of a foldable screen body. The foldable screen body may be understood as a state in which the foldable screen is not fastened to the middle frame or the housing of the electronic device, and only the foldable screen is folded. It can be learned from the figure that no corrugation or arching occurs on the entire foldable screen, and the layers of the foldable screen can be dislocated freely in the folding process. A rightmost part of FIG. 9 is a schematic diagram of a state present after the foldable screen is folded for a plurality of times after being fastened to the middle frame or the housing of the electronic device. From the figure, it can be learned that arching and corrugation, and detachment between the layers occur after the foldable screen is folded for the plurality of times.

Figure 10:
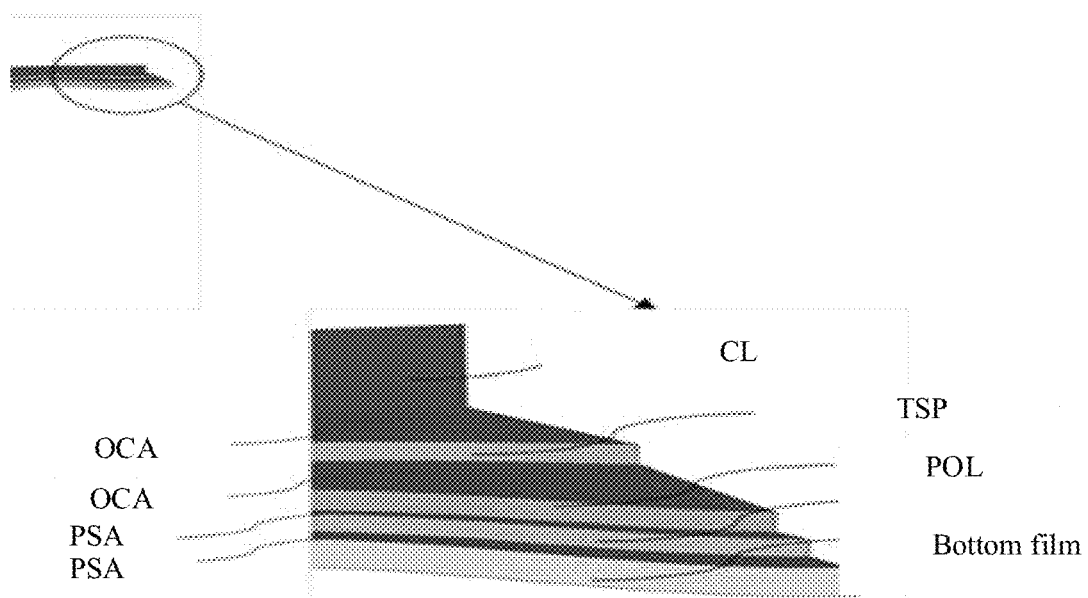
FIG. 10 is a schematic diagram of an example of a layer dislocation effect that occurs at an end face of the layers of a foldable screen when the foldable screen is bent.

Because the foldable screen is formed by stacking a plurality of layers of materials together through gluing, the foldable screen has a specific thickness. A length of the screen in the folding process needs to be maintained the same as that in an unfolded state. To ensure relative dislocation of the layers of the screen and avoid problems such as arching of the screen in the folding process, theoretically; lengths of the layers of the screen shall be different on an end face (a layer dislocation effect) when the screen is folded. FIG. 10 is a schematic diagram of the layer dislocation effect of the layers of the foldable screen that occurs on the end face when the foldable screen is bent. From FIG. 10, it can be learned that, when the foldable screen is folded, the lengths of the layers of the foldable screen are different on the end face in an ideal state. The dislocation of the layers of the screen is implemented by the OCA or the PSA.

For the electronic device shown in FIG. 7 or FIG. 8, a periphery of the cover layer of the foldable screen is fixedly connected to the housing, and the display layer may be or may not be fixedly connected to the housing. Regardless of whether the display layer is fixedly connected to the housing, because the display layer has a specific thickness and includes a plurality of layers of materials, after the foldable screen is folded for a plurality of times, free and mutual dislocation cannot be implemented between the layers of the cover layer, between the cover layer and the display layer, or between the layers of materials of the display layer.

Figure 11:
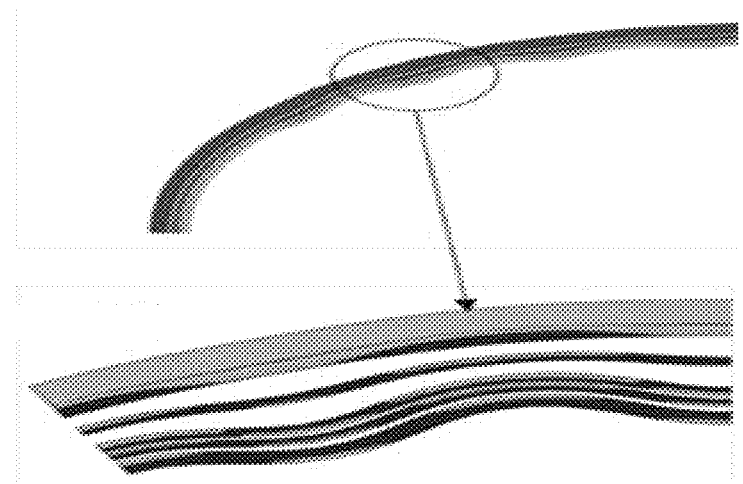
FIG. 11 is a schematic diagram of an example of arching of a foldable screen.

As a result, the layers of the screen cannot be dislocated smoothly, and further corrugation occurs on a part of the screen. Long-time corrugation causes detachment due to fatigue of adhesive glue between the layers of the foldable screen. In a process of folding the electronic device for a plurality of times, detachment and screen arching may occur between the layers of the foldable screen. Consequently, normal use of a user is severely affected. For example, for the electronic device shown in FIG. 7 or FIG. 8, as shown in FIG. 11, after the foldable screen is folded for a plurality of times, arching of the foldable screen shown in FIG. 11 may occur.

In view of this, this application provides a foldable electronic device, to reduce a possibility that corrugation occurs on a part of a screen when the screen is folded, avoid arching occurring on a part of the screen to a great extent, avoid detachment between the layers of the screen that occurs after the screen is folded for a plurality of times, resolve a problem that the screen is not flat after the screen is folded for a plurality of times, and improve user experience.

Figure 12:
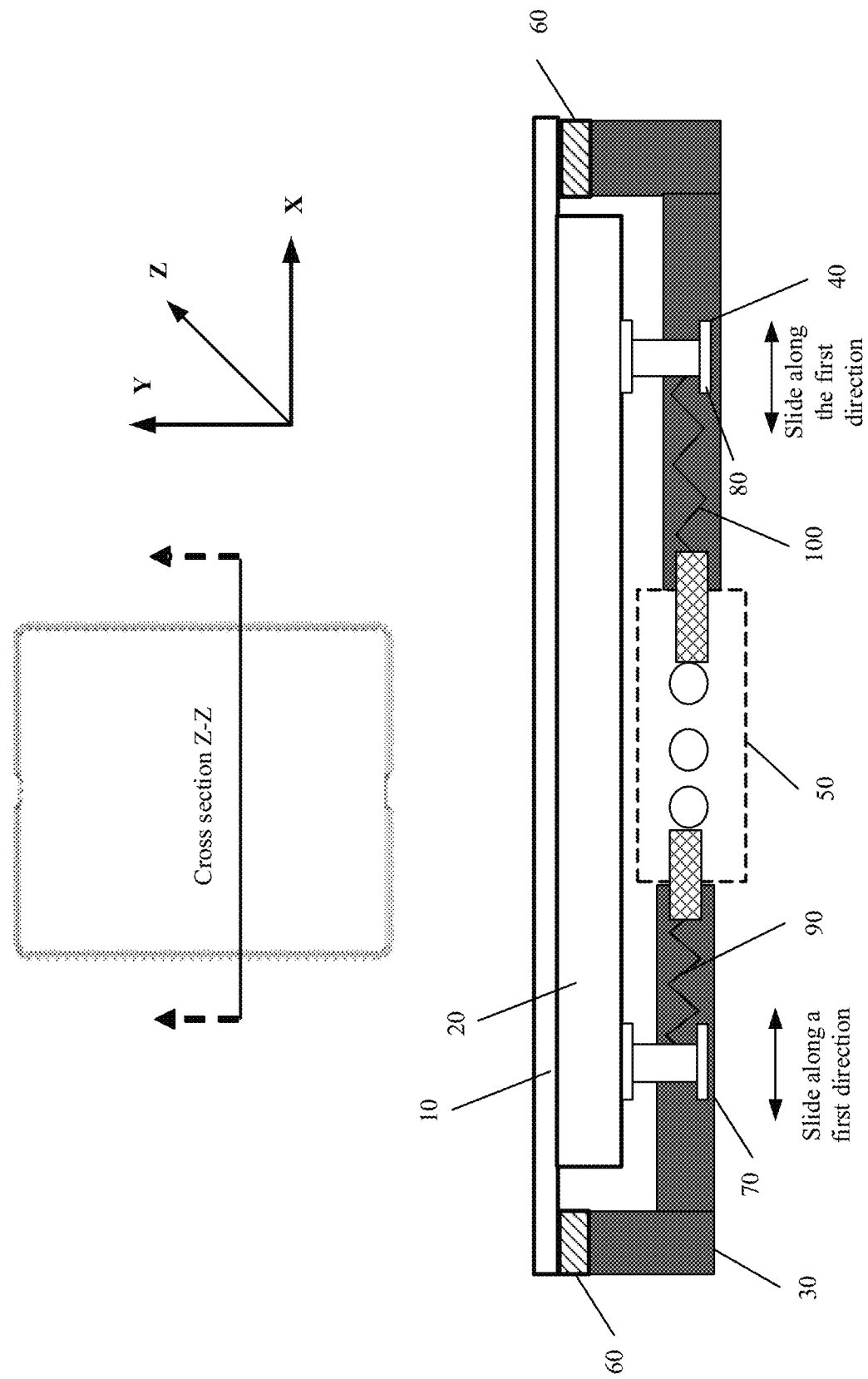
FIG. 12 is a schematic structural diagram of an example of a foldable electronic device in an unfolded state according to this application.

The following describes, with reference to FIG. 12, a foldable electronic device provided in this application. FIG. 12 is a schematic structural diagram of an example of a foldable electronic device in an unfolded state along a cross section Z-Z according to this application. A Z-axis direction is a thickness direction of the electronic device. The electronic device includes a foldable screen (which may also be referred to as a foldable screen), a first housing 30, and a second housing 40.

The foldable screen is formed by fixedly gluing a cover layer 10 and a display layer 20. Both the cover layer 10 and the display layer 20 are formed by gluing a plurality of layers of materials. The cover layer may also be referred to as a flexible cover layer, and the display layer may also be referred to as a display module assembly. The cover layer 10 is an outermost layer of the foldable screen, and the cover layer 10 may be understood as the front side of the foldable screen, that is, a side of the foldable screen that can be seen or touched by the user. The display layer 20 is an inner layer of the foldable screen. The inner layer of the foldable screen may also be referred to as the back side of the foldable screen. The back side of the foldable screen is located inside a housing, is in contact with an element such as a circuit board of the electronic device, and is not in direct contact with a user. For a position relationship, dimensions, and the like of the cover layer 10 and the display layer 20, refer to the foregoing descriptions in FIG. 2. For composition materials of the layers of the cover layer 10 and the display layer 20 and the like, refer to the foregoing descriptions in FIG. 4 to FIG. 6. Details are not described herein again.

The first housing 30 and the second housing 40 are connected by using a folding shaft 50. For example, the first housing 30 and the second housing 40 may be rotatably connected by using the folding shaft 50. The housing may also be referred to as a middle frame or a support component, and the first housing 30 and the second housing 40 may also be referred to respectively as a first middle frame 30 and a second middle frame 40, or a first support component 30 and a second support component 40. The folding shaft may also be referred to as a rotating shaft. The first housing 30 and the second housing 40 may rotate relatively around or along the folding shaft 50. A traction mechanism 70 is disposed on the first housing 30, and a traction mechanism 80 is disposed on the second housing 40. The traction mechanisms may also be referred to as sliding mechanisms or the like. The traction mechanism 70 and the traction mechanism 80 are clamped on the first housing 30 and the second housing 40 along a Z-axis direction, respectively. That is, the traction mechanism 70 cannot move relative to the first housing 30 along the Z-axis direction, and the traction mechanism 80 cannot move relative to the second housing 40 along the Z-axis direction. The cover layer 10 is fixedly connected to the first housing 30 and the second housing 40. For example, three sides of the cover layer 10 may be fixedly connected to the first housing 30 and the second housing 40. The fixed connection may be performed, for example, through gluing or welding or by using a screw and a nut. This is not limited herein in this application. An innermost layer of the foldable screen is an innermost side of the display layer 20. The innermost side (which may also be referred to as an innermost layer of the display layer 20) of the display layer 20 is fixedly connected to the traction mechanism 70 and the traction mechanism 80. The fixed connection may be performed, for example, through gluing or welding or by using a screw and a nut. In a process of folding the foldable screen, the traction mechanism 70 may slide on the first housing 30 along a first direction. That is, the traction mechanism 70 is connected to the first housing 30 in a slidable manner, and the traction mechanism 70 may move back and forth on the first housing 30. The traction mechanism 80 may slide on the second housing 40 along the first direction. That is, the traction mechanism 80 is connected to the second housing 40 in a slidable manner, and the traction mechanism 80 may move back and forth on the second housing 40. The first direction is a direction perpendicular to the folding shaft 50. The first direction may be understood as a folding direction along which the foldable screen is folded. In an example shown in FIG. 12, the first direction is an X-axis direction. The traction mechanism shown in FIG. 12 is an "I"-shaped traction mechanism, an upper part of the "I"-shaped traction mechanism is fixedly connected to the innermost side of the display layer 20, a lower part of the "I"-shaped traction mechanism is clamped on the housing, and the "I"-shaped traction mechanism can slide on the housing.

Optionally, as shown in FIG. 12, the traction mechanism 70 may be connected to the folding shaft 50 by using a spring 90, and the traction mechanism 80 may be connected to the folding shaft 50 by using a spring 100. In a process of folding the foldable screen, the folding shaft 50 pushes, by using the spring 90, the traction mechanism 70 to slide or move on the first housing 30 along the first direction. When the user folds the screen, an acting force of the user acts on the folding shaft 50, the folding shaft 50 pushes, based on the acting force of the user by using the spring 90, the traction mechanism 70 to slide or move on the first housing 30 along the first direction, and the folding shaft 50 pushes, based on the acting force of the user by using the spring 100, the traction mechanism 80 to slide or move on the second housing 40 along the first direction. Both sliding of the traction mechanism 70 and sliding of the traction mechanism 80 may drag the innermost side of the display layer 20 to move along the first direction. Because the cover layer 10 is fixedly connected to the first housing 30 and the second housing 40, in the screen folding process, positions of the cover layer 10 relative to the first housing 30 and the second housing 40 do not change. In this case, when the foldable screen is being folded, it may be considered that a length of the cover layer 10 remains unchanged. The traction mechanism 70 and the traction mechanism 80 drag the innermost side of the display layer 20 to move along the first direction. In the process in which the innermost side of the display layer 20 moves along the first direction, mutual dislocation between the layers included in the display layer 20 and mutual dislocation of the display layer 20 relative to the cover layer 10 may be assisted in, so as to assist in relative dislocation between the layers of the foldable screen.

According to the foldable electronic device provided in this application, in the process of folding the foldable screen, the traction mechanisms disposed on the housing drag the innermost layer of the foldable screen to slide along the folding direction, and the outermost layer of the foldable screen is fixedly connected to the housing and is immobile relative to the housing, so as to release a degree of freedom of the foldable screen along the folding direction, assist in dislocation of the layers of the screen in the process of folding the foldable screen and motion along the folding direction, avoid corrugation and arching of a part of the screen that occur when the screen is folded, avoid detachment between the layers of the screen that occurs after the screen is folded for a plurality of times, and resolve a problem that the screen is not flat after the screen is folded for a plurality of times. In this way, user experience is improved.

It should be understood that, in this embodiment of this application, the traction mechanism 70 may not be connected to the folding shaft 50, and the traction mechanism 80 may not be connected to the folding shaft 50, either. That is, the electronic device may alternatively not include the spring 90 or the spring 100. When the traction mechanism is not connected to the folding shaft, driving mechanisms may be disposed on the housing, and the driving mechanisms are configured to drive the traction mechanism 70 and the traction mechanism 80 to slide respectively on the first housing 30 and the first housing 40 when the foldable screen is being folded, so as to drag the innermost side of the display layer 20 to move along the first direction. In the process in which the innermost side of the display layer 20 moves along the first direction, mutual dislocation between the layers included in the display layer and mutual dislocation of the display layer 20 relative to the cover layer 10 may be assisted in, so as to assist in relative dislocation between the layers of the foldable screen. For example, the driving mechanism may be a motor, and the motor may generate an active pushing force that pushes the traction mechanism 80 to slide or move on the second housing 40 along the first direction. For example, the active pushing force generated by the motor can push, by using a gear, a butterfly-shaped sheet, an eccentric wheel, or the like, the traction mechanism 80 to slide or move on the second housing 40 along the first direction. This is not limited herein in this embodiment of this application.

It should be further understood that the electronic device may alternatively not include the driving mechanisms. In this case, the traction mechanism 70 may not be connected to the folding shaft 50, and the traction mechanism 80 may not be connected to the folding shaft 50, either. That is, the electronic device may not include the spring 90 or the spring 100. In the process of folding the foldable screen, because internal stress is generated on the screen when the screen is being folded, and the display layer of the screen is fixedly connected to the traction mechanism, the internal stress drives the traction mechanism 70 and the traction mechanism 80 to slide on the first housing 30 and the second housing 40, respectively, so as to drag the innermost side of the display layer 20 to move along the first direction.

It should be further understood that what is shown in FIG. 12 is merely an example, and shall not limit a specific structure of a traction mechanism, a quantity of traction mechanisms, a position of a traction mechanism on the housing, and the like in this application. For example, the traction mechanism may be disposed in a position, corresponding to an edge of the display layer, along the first direction. The traction mechanism may alternatively be a sliding sheet, a sliding block, or the like. This is not limited herein in this application.

Figure 13:
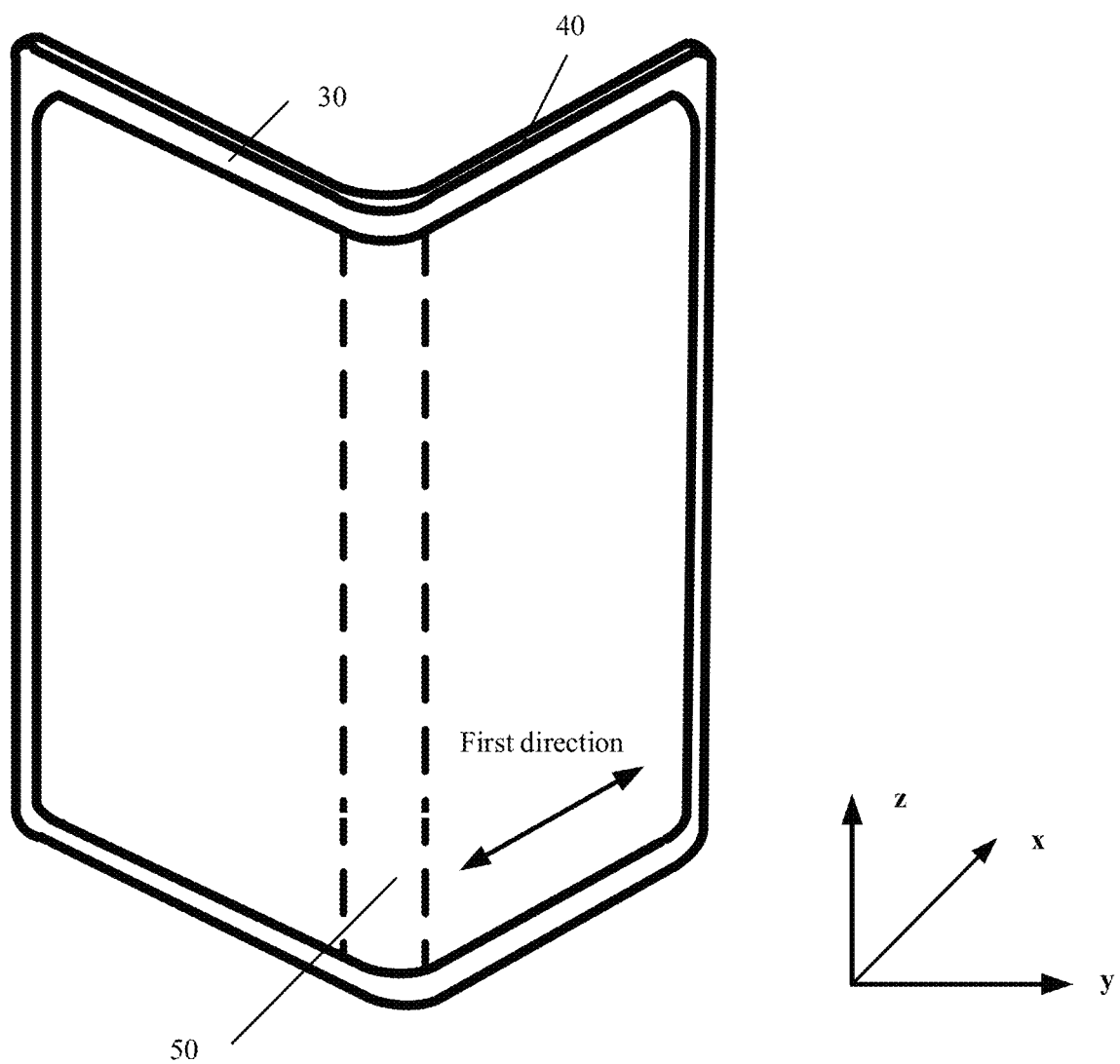
FIG. 13 is a schematic diagram of an example of a folding shaft and a first direction that are present when an electronic device is vertically placed according to this application.

In this embodiment of this application, the folding shaft 50 may be parallel to either of two adjacent sides of the foldable screen based on different manners of folding the foldable screen. For example, when the foldable screen is placed parallel to a horizontal plane, the folding shaft 50 may be parallel to the Y-axis direction, that is, the foldable screen is folded along the X-axis direction. Alternatively the folding shaft 50 may be parallel to the X-axis direction, that is, the foldable screen is folded along the Y-axis direction. The folding shaft 50 may be located in the middle of the foldable screen, or may be located in another position of the foldable screen. A foldable screen may include one or more folding shafts 50. The first direction is a direction perpendicular to the folding shaft 50. The first direction may be understood as a direction along which the foldable screen is folded. For example, FIG. 13 is a schematic diagram of a folding shaft 50 and a first direction that are present when an electronic device is vertically placed. As shown in FIG. 13, the folding shaft 50 is along a Z-axis direction, a bottom edge of the second housing 40 is in an X-axis direction, and a Y-axis direction is perpendicular to the X-axis direction and is on the same plane as the X axis. The first direction is the X-axis direction, and the Z axis is perpendicular to the Y-axis direction and the X-axis direction. The first direction is a folding direction of a foldable screen. It should be understood that FIG. 13 is merely an example, and shall not limit a position and a direction of the folding shaft in this embodiment of this application. In this embodiment of this application, the folding shaft may alternatively be located in another position of the foldable screen, and a direction of the foldable shaft may be another direction. For example, the foldable shaft is along the X-axis direction, or may have a specific angle relative to the Z-axis direction. A direction of the folding shaft, a position of the folding shaft on the foldable screen, a quantity of folding shafts, and the like are not limited in this application.

Figure 14:
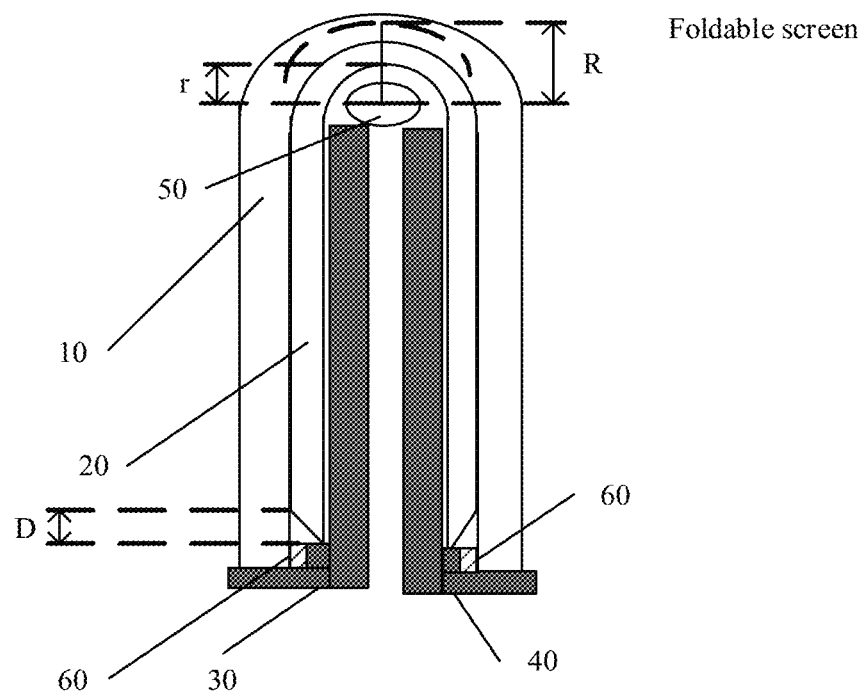
FIG. 14 is a schematic structural diagram of an example of a foldable electronic device in a folded state according to this application.

FIG. 14 is another schematic structural diagram of the foldable electronic device in a folded state according to this application. The three sides of the cover layer 10 are fixedly connected to the first housing 30 and the second housing 40. Because it may be considered that the length of the cover layer 10 remains unchanged when the screen is folded, as shown in FIG. 14, when the screen is folded to a maximum extent, an elongation amount of the innermost side of the display layer 20 relative to the cover layer 10 is D. To enable the traction mechanisms to assist, when the foldable screen is being folded, the innermost layer of the foldable screen in sliding along the folding direction, a distance by which the traction mechanism drags the innermost side of the display layer 20 to move along the first direction (folding direction) may be L, where $0 < L \leq D$. This can avoid or reduce corrugation and arching of the screen that occur on a part of the screen when the screen is folded.

Figure 15:
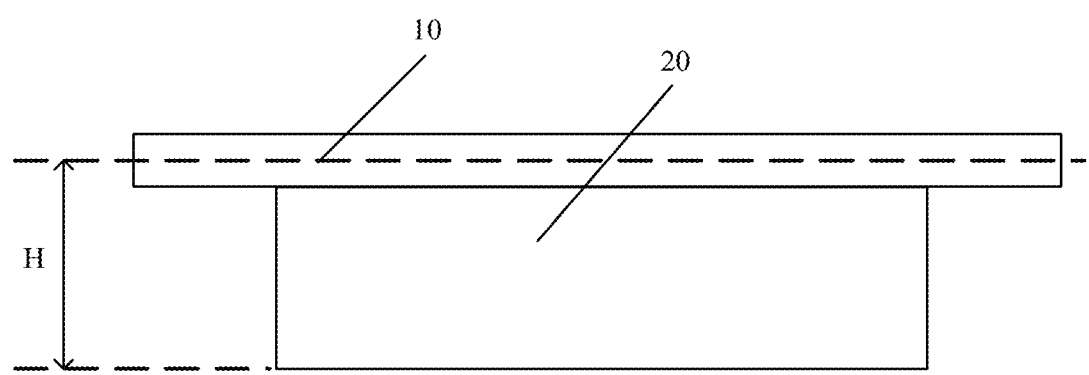
FIG. 15 shows an example of a relationship among H, a thickness of a display layer, and a thickness of a cover layer according to this application.

Specifically, a value of D may be calculated based on a formula $D = 2\pi(R-r)/2 = \pi H$. In the formula, as shown in FIG. 14, R is a bending radius of the cover layer 10, and r is a bending radius of the innermost layer of the display layer 20. H is a difference between the bending radius of the cover layer 10 and the bending radius of the innermost layer of the display layer 20. FIG. 15 shows a relationship among H, a thickness of the display layer 20, and a thickness of the cover layer 10. As shown in FIG. 15, H is a sum of a half of the thickness of the cover layer 10 and the thickness of the display layer 20.

In some specific implementations of this application, considering factors such as strength of the display layer, because the traction mechanisms (for example, sliding blocks) and the display layer cannot move relative to each other, when the foldable screen is being folded, the traction mechanisms drag the innermost side of the display layer to move on the housing along the first direction. If the traction mechanisms are fixedly connected to the innermost side of the display layer directly, because a contact area of the display layer and the traction mechanism is small compared with an area of the display layer, when the screen is folded, a part, in contact with the traction mechanism, of the display layer may move along the housing in the first direction: but a part, not in contact with the traction mechanism, of the display layer may not move along the housing in the first direction, that is, corrugation or arching may occur on the display layer. In this case, screen reinforcement sheets may be disposed on a side, connected to the traction mechanisms, of the display layer. The screen reinforcement sheet may be made of a material having higher rigidity than the display layer, and hardness and strength of the screen reinforcement sheet may be higher than those of the display layer. The screen reinforcement sheets may be first fastened to the display layer, and then the traction mechanisms are fastened to the screen reinforcement sheets.

Figure 16:
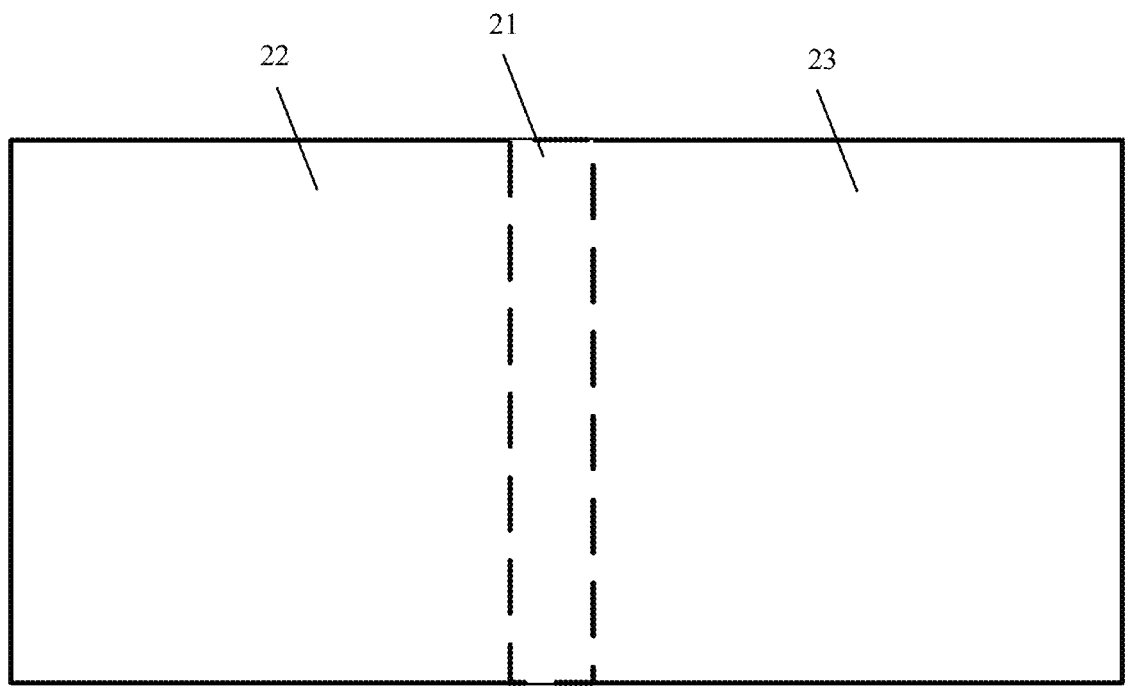
FIG. 16 is a schematic diagram of another example of a folding region, a first display region, and a second display region that are present when a display layer is in an unfolded state along a thickness direction perpendicular to the display layer according to this application.

Specifically, the display layer 20 may be divided into a folding region 21, a first display region 22, and a second display region 23. The folding region 21 is a region, corresponding to a folding shaft 50, of the display layer 20. FIG. 16 is a schematic diagram of the folding region 21, the first display region 22, and the second display region 22 that are present when the display layer 20 is in an unfolded state along a thickness direction perpendicular to the display layer. The folding region 21 is a display layer region corresponding to the folding shaft 50. When the foldable screen is folded, the folding region 21 is in a bent state. The first display region 22 and the second display region 23 are located on two sides of the folding region 21. A sum of an area of the first display region 22, an area of the second display region 23, and an area of the folding region 21 is an area of the display layer 20. It should be understood that the area of the display layer 20 herein may be understood as an area of the innermost side, perpendicular to a thickness direction of the display layer 20, of the display layer 20. The area of the first display region 22 may be understood as an area of the innermost side of the first display region 22 in a direction perpendicular to the thickness direction of the display layer 20, and the area of the second display region 23 may be understood as an area of the innermost side of the second display region 23 in a direction perpendicular to the thickness direction of the display layer 20. A sum of the areas of the first display region 22 and the second display region 23 is less than the area of the display layer 20. It should be further understood that the folding region 21, the first display region 22, and the second display region 23 are not physical divisions of the display layer 20, and the display layer 20 is still an entire display layer. The folding region 21, the first display region 22, and the second display region 23 are not three separate display regions.

Figure 17:
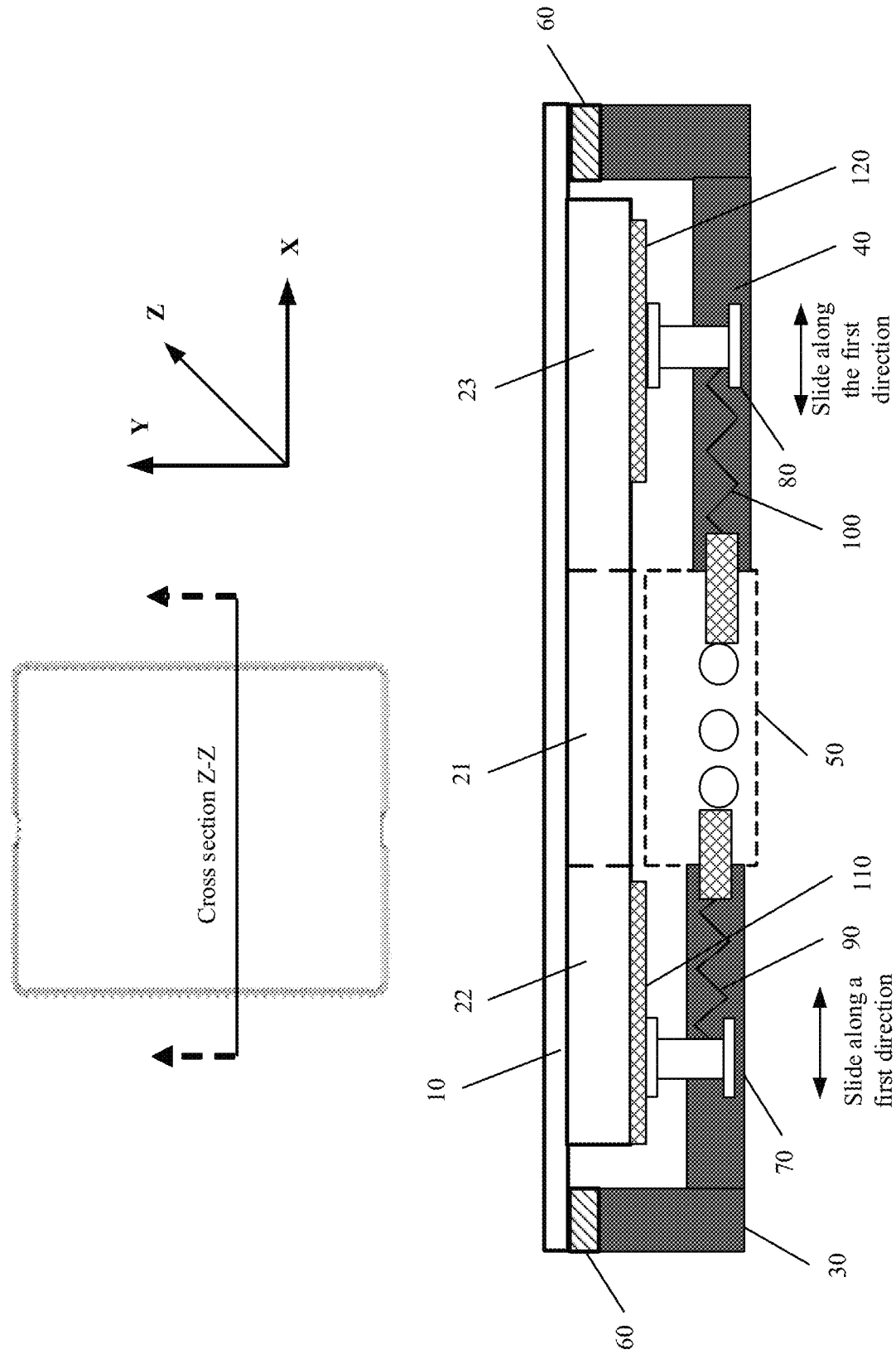
FIG. 17 is a schematic structural diagram of another example of a foldable electronic device in an unfolded state according to this application.

FIG. 17 is another example of a schematic structural diagram obtained by cutting the foldable electronic device in an unfolded state along a cross section Z-Z according to this application. A Z-axis direction is a thickness direction of the electronic device. The foldable screen includes a first screen reinforcement sheet 110 and a second screen reinforcement sheet 120.

The first screen reinforcement sheet 110 is fixedly connected to the innermost layer of the first display region 22. That is, the first screen reinforcement sheet 110 is first fixedly connected to the innermost side of the first display region 22. The fixed connection may be performed, for example, through gluing or welding or by using a screw and a nut. Then, a traction mechanism 70) on the first housing 30 is fixedly connected to the first screen reinforcement sheet 110.

The second screen reinforcement sheet 120 is fixedly connected to the innermost layer of the second display region 23. That is, the second screen reinforcement sheet 120 is first fixedly connected to the innermost side of the second display region 23, and then a traction mechanism 80) on the second housing 40 is fixedly connected to the second screen reinforcement sheet 110.

The screen reinforcement sheets are first fastened to the innermost sides of the first display region and the second display region, and then the display layer is fixedly connected to the traction mechanisms by using the screen reinforcement sheets. The traction mechanisms are not in direct contact with the innermost side of the display layer, but are in contact with and fixedly connected to the screen reinforcement sheets with higher rigidity. This can improve an effect that, in a process of folding the foldable screen, the traction mechanisms are used to drag the layers of the foldable screen to be dislocated on the housing along a first direction, and enhance efficiency of dislocation of the layers of the screen in the process of folding the foldable screen and efficiency of motion along the folding direction.

It should be understood that an area of the first screen reinforcement sheet 110 may be the same as that of the first display region 22. In other words, the first screen reinforcement sheet 110 is disposed on an entire surface on the innermost side of the first display region 22. Certainly, the area of the first screen reinforcement sheet 110 may alternatively be less than that of the first display region 22. In other words, the first screen reinforcement sheet 110 is disposed on a part of a surface on the innermost side of the first display region 22. The first screen reinforcement sheet 110 may be disposed in a position, at an edge of the first display region 22, corresponding to the traction mechanism 70. Similarly, an area of the second screen reinforcement sheet 120 may be the same as that of the second display region 23, or an area of the second screen reinforcement sheet 120 may be less than that of the second display region 23. The second screen reinforcement sheet 120 may be disposed in a position, at an edge of the second display region 23, corresponding to the traction mechanism 80. A sum of the areas of the first screen reinforcement sheet 110 and the second screen reinforcement sheet 120 is less than the area of the display layer 20.

It should be further understood that a screen reinforcement sheet may not be disposed on the innermost side of the folding region 21.

In other specific implementations of this application, the screen reinforcement sheet and the traction mechanism may be first assembled together or integrally formed. Then, a traction mechanism with a screen reinforcement sheet is fixedly clamped on the housing, and one end with the screen reinforcement sheet is fixedly connected to the innermost layer of the display layer 20. Specifically, an example of the first screen reinforcement sheet 110 and the traction mechanism 70 may be used for description in the following two manners.

In a first manner, the first screen reinforcement sheet 110 is first fixedly connected to the traction mechanism 70, and the first screen reinforcement sheet 110 and the traction mechanism 70 may be manufactured separately and then are assembled together. For example, the first screen reinforcement sheet 110 and the traction mechanism 70 may be assembled together through gluing, by using a buckle, a screw and a nut, or the like. The first screen reinforcement sheet 110 and the traction mechanism 70 cannot move relative to each other. Then, the traction mechanism 70 with which the first screen reinforcement sheet 110 is assembled is clamped on the first housing 30, and one end with the screen reinforcement sheet 110 is fixedly connected to the innermost layer of the first display region 22. Similarly, the second screen reinforcement sheet 120 may alternatively be first fixedly connected to the traction mechanism 80, then the traction mechanism 80 with which the second screen reinforcement sheet 120 is assembled is clamped on the second housing 40, and one end with the screen reinforcement sheet 120 is fixedly connected to the innermost layer of the second display region 23.

In a second manner, the screen reinforcement sheet 110 and the traction mechanism 70 may be integrally formed. That is, in a process of making the screen reinforcement sheet 110 and the traction mechanism 70, the screen reinforcement sheet 110 and the traction mechanism 70 are formed as a whole. After the screen reinforcement sheet 110 and the traction mechanism 70 are integrally formed, one end with the screen reinforcement sheet 110 is fixedly connected to the innermost layer of the first display region 22, and the other end is clamped on the first housing 30. Similarly, the screen reinforcement sheet 120 and the traction mechanism 80 may also be integrally formed. One end of the screen reinforcement sheet 120 is fixedly connected to the innermost layer of the second display region 23, and the other end is clamped on the second housing 40.

In some specific implementations of this application, the first screen reinforcement sheet 110 and the second screen reinforcement sheet 120 are merely disposed on two sides of the folding region 21, and no screen reinforcement sheet is disposed on the innermost side of the folding region 21. In the process of folding the foldable screen, the first screen reinforcement sheet 110 and the second screen reinforcement sheet 120 are not bent. In the process of folding the foldable screen, arching and the like may occur in the folding region 21 during bending. Therefore, a layer of screen strengthening sheet may be further fixedly connected to the innermost layer of the entire display layer 20, an area of the screen strengthening sheet may be the same as that of the display layer 20, and the screen strengthening sheet is also fixedly connected to the innermost side of the folding region 21. The screen strengthening sheet may be fixedly connected to the innermost side of the entire display layer 20 through gluing, that is, the screen strengthening sheet may be considered as a layer of material included in the foldable screen. When the foldable screen is being folded, the screen strengthening sheet and the folding region 21 may be bent at the same time. The first screen reinforcement sheet 110 and the second screen reinforcement sheet 120 may be fixedly connected to the screen strengthening sheet. An area of the screen strengthening sheet may be the same as that of the innermost side of the display layer 20, that is, one layer of screen strengthening sheet may be fastened on an entire surface on the innermost side of the display layer 20. An area of the screen strengthening sheet may be greater than a sum of areas of the first screen reinforcement sheet 110 and the second screen reinforcement sheet 120. In this way, the traction mechanisms may guide the first screen reinforcement sheet 110 and the second screen reinforcement sheet 120 to move along the folding direction, and motion of the first screen reinforcement sheet 110 and the second screen reinforcement sheet 120 may guide motion of the screen strengthening sheet, so that the screen strengthening sheet can guide the innermost side of the entire display layer 20 to move along the folding direction. When the foldable screen is folded, flatness of a surface of the entire display layer can be ensured, avoiding screen arching and the like.

In this embodiment of this application, the screen strengthening sheet may be made of a material such as a stainless steel sheet. For example, a thickness of the stainless steel sheet may be 0.03 mm, and an area of the stainless steel sheet may be the same as that of the display layer. When the foldable screen is folded, the stainless steel sheet may be folded together with the foldable screen. It should be understood that the screen strengthening piece may alternatively be made of another material, for example, plastic, provided that the screen strengthening sheet can enhance hardness of the display layer and can be folded with the foldable screen.

It should be further understood that, in some specific implementations of this application, the traction mechanisms on the first housing and the second housing may be further fixedly connected to the screen strengthening sheet at the innermost layer of the display layer 20 directly. In other words, the electronic device provided in this application may not include the first screen reinforcement sheet 110 or the second screen reinforcement sheet 120.

In some specific implementations of this application, a clamping slot is disposed on the housing, the traction mechanism includes a sliding block, the sliding block is disposed in the clamping slot, the sliding block slides in the clamping slot along the first direction, and the sliding block is fixedly connected to the innermost layer of the foldable screen, or the sliding block is fixedly connected to the screen enhancement sheet at the innermost layer of the foldable screen.

Figure 18:
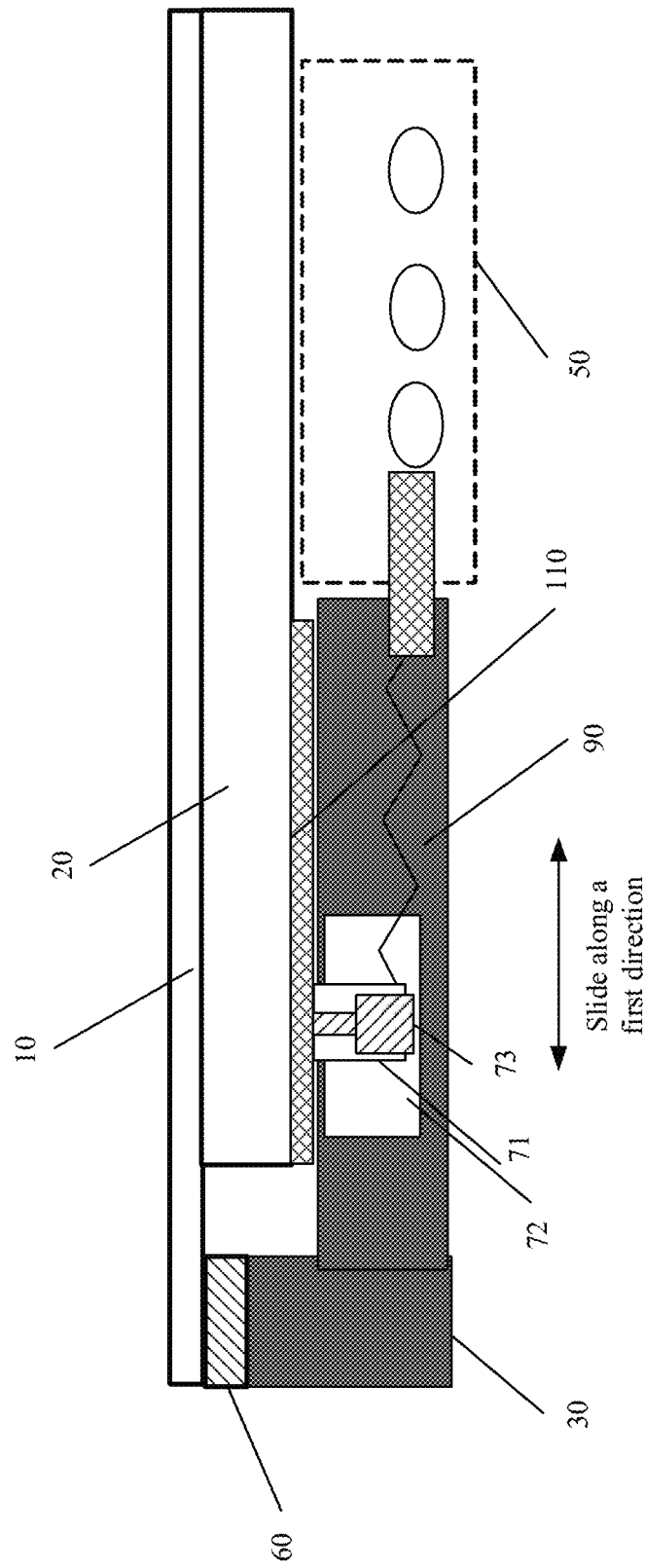
FIG. 18 is a schematic structural diagram of an example in which a traction mechanism is a sliding block according to this application.

Specifically, in some specific implementations, the traction mechanism 70 is used as an example for description. FIG. 18 is a schematic structural diagram of an example in which the traction mechanism is a sliding block. The traction mechanism 70 may include a sliding block 71. A clamping slot 72 is provided on the first housing 30, the clamping slot 72 is used to accommodate the sliding block 71, and the sliding block 71 may slide by a distance in the clamping slot 72. A fastening screw 73 is configured to fixedly connect the sliding block 71 and the first screen reinforcement sheet 110. The sliding block 71 is connected to the folding shaft 50 by using the spring 90. When the foldable screen is being folded, the folding shaft 50 pushes, by using the spring 90, the sliding block 71 to slide or move on the first housing 30 along the first direction. The movement of the sliding block 71 may drag the innermost side of the display layer 20 to move along the first direction, so as to achieve an objective of assisting in dislocation of the layers of the display screen. Similarly, the traction mechanism 80 may also be implemented in a similar manner, and details are not described herein again. It is easy to implement the traction mechanisms by using the sliding blocks. In this way, complexity is comparatively low; and costs of the traction mechanisms are further reduced In some other possible implementations, the traction mechanism may be connected to the housing by using a slide rail, a chute, a sliding track, or the like, so that the traction mechanism moves back and forth on the housing in a direction of the slide rail, the chute, or the sliding track.

Figure 19:
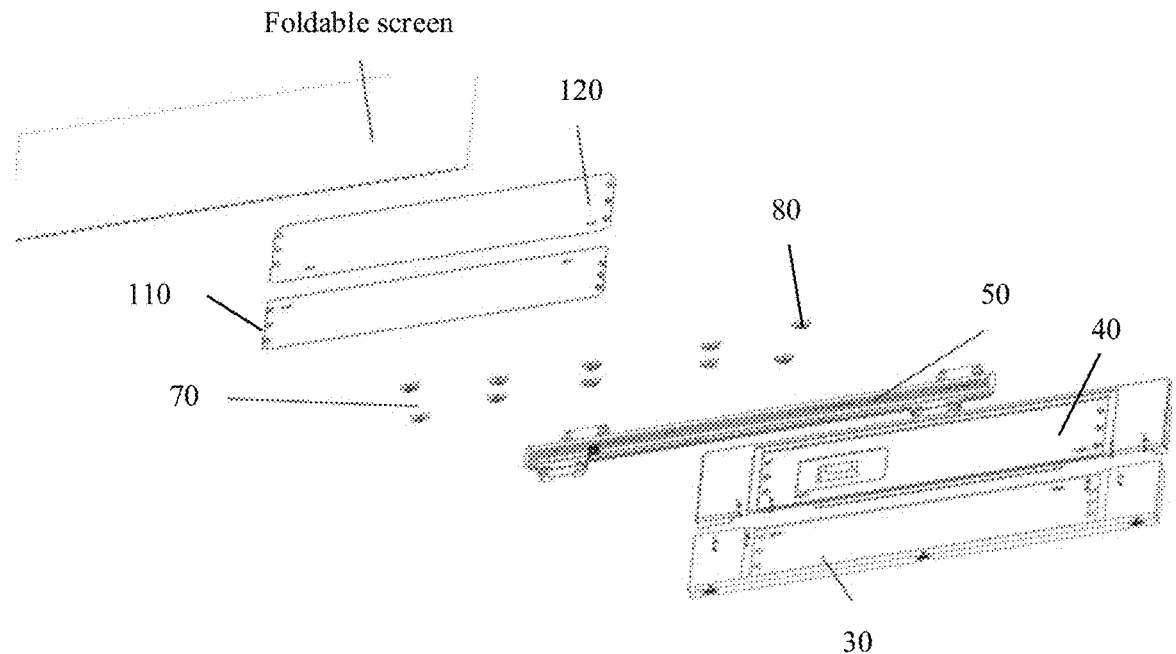
FIG. 19 is an exploded view of a foldable electronic device according to this application.

FIG. 19 is an exploded diagram of an example of an electronic device according to this application. As shown in FIG. 19, the electronic device provided in this application includes a foldable screen, a first screen reinforcement sheet 110, a second screen reinforcement sheet 120, a folding shaft 50, a first housing 30, a second housing 40, a traction mechanism 70, and a traction mechanism 80. The foldable screen is formed by fixedly gluing a cover layer 10 and a display layer 20. The first screen reinforcement sheet 110 and the second screen reinforcement sheet 120 are fixedly connected to an innermost layer of the foldable screen. The first screen reinforcement sheet 110 and the second screen reinforcement sheet 120 are located on two sides of the folding shaft 50. The traction mechanism 70 is disposed on the first housing 30, and the traction mechanism 80 is disposed on the second housing 40. The traction mechanism 70 is fixedly connected to the first screen reinforcement sheet 110, the traction mechanism 80 is fixedly connected to the second screen reinforcement sheet 120, and the traction mechanism 70 and the traction mechanism 80 may slide on the first housing 30 and the second housing 40, respectively. There are five traction mechanisms 70 and five traction mechanisms 80 shown in FIG. 19. It should be understood that a quantity of traction mechanisms 70 and a quantity of traction mechanisms 80 may alternatively be other values. A position of the traction mechanism 70 on the first housing 30, a position of the traction mechanism 80 on the second housing 40, the quantity of traction mechanisms 70, and the quantity of traction mechanisms 80 are not limited in this application, provided that the traction mechanism 70 and the traction mechanism 80 can drag, when the foldable screen is being folded, the innermost side of the foldable screen to move along the first direction, so as to assist in dislocation of the layers of the display screen.

In some possible implementations of this application, the traction mechanism may be a swing lever traction mechanism. One end of the swing lever traction mechanism is connected to the folding shaft: and the other end is fixedly connected to the innermost layer of the foldable screen, or the other end of the swing lever traction mechanism is fixedly connected to the first screen reinforcement sheet or the second screen reinforcement sheet. Specifically, one end of a swing lever of the swing lever traction mechanism is connected to a rotating shaft, and the other end is fixedly connected to a screen reinforcement sheet, or is fixedly connected to the innermost layer of the foldable screen. When the foldable screen is being folded, the rotating shaft can push the swing lever to move. The movement of the swing lever can drive the other end of the swing lever traction mechanism to move, so that the innermost layer of the foldable screen is dragged to move along a folding direction.

In some specific implementations of this application, for example, when the traction mechanism is not connected to the folding shaft, driving mechanisms may be disposed on the housing. For example, a driving mechanism may be disposed on each of the first housing 30 and the first housing 40. The driving mechanism on the first housing 30 is configured to drive the traction mechanism 70 on the first housing 30 to move along the folding direction. The driving mechanism on the second housing 40 is configured to drive the traction mechanism 80 on the second housing 40 to move along the folding direction, so that the traction mechanism 70 and the traction mechanism 80 drag the innermost side of the display layer 20 to move along the first direction, to assist in dislocation of the layers of the screen and motion along the folding direction in the process of folding the foldable screen. In this embodiment of this application, a position of the driving mechanism on the housing and a quantity of driving mechanisms are not limited.

Figure 20:
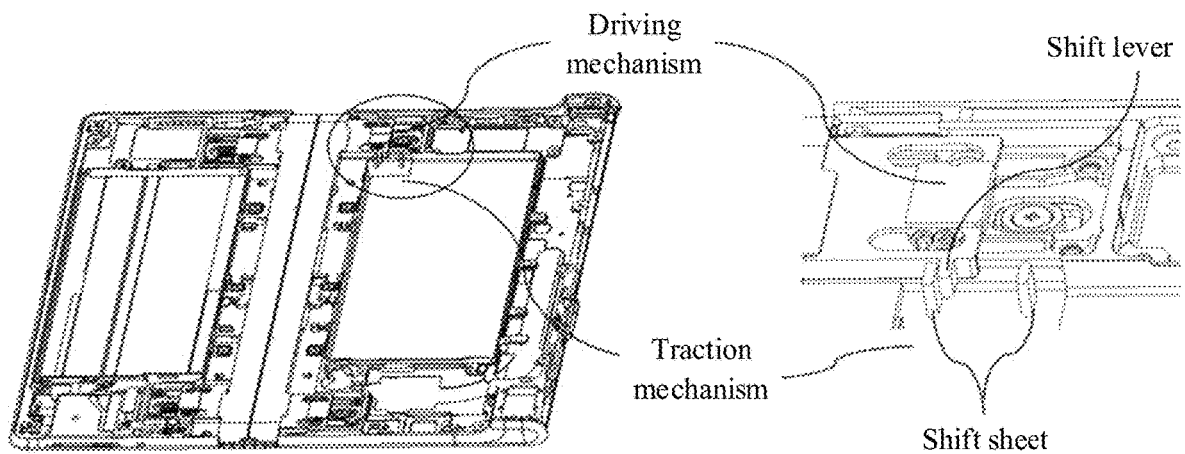
FIG. 20 is a schematic structural diagram of an example of shift levers and shift sheets according to this application.

In a possible implementation, the driving mechanism may include a shift lever (which may also be referred to as a shift lever apparatus), the traction mechanism may include at least two shift sheets, the shift lever is located between any two shift sheets, and the shift lever is configured to push the traction mechanism to slide. For example, FIG. 20 is a schematic diagram of driving mechanisms, shift levers, and shift sheets of traction mechanisms. The shift lever of the driving mechanism is located between two shift sheets of the traction mechanism, and moves back and forth between the two shift sheets. The shift lever is configured to push the traction mechanism to move. A distance between the two shift sheets (or positions of the two shift sheets) of the traction mechanism determines a displacement or a stroke of the shift lever, and the displacement or the stroke of the shift lever determines a reciprocal motion displacement of the traction mechanism.

In some specific implementations of this application, the traction mechanism may be a mechanism such as a sliding sheet, a gear, a butterfly-shaped sheet, or an eccentric wheel. A specific structure and form of the traction mechanism are not limited in this application.

In some specific implementations of this application, the driving mechanism may be a motor, a spring, a folding shaft on the housing, or the like. A specific structure and form of the driving mechanism are not limited in this application.

It should also be understood that a driving force that drives the traction mechanism to move may come from the foldable screen. For example, when the foldable screen is being folded, the display layer may generate stress, and the stress acts on the traction mechanism, to drive the traction mechanism to move.

In some specific implementations of this application, when the foldable screen is in an unfolded state, the driving mechanism is further configured to generate a force for driving the traction mechanism to pull the foldable screen along the first direction and toward an outer side of the foldable screen, so that the foldable screen is in a flattened state.

Figure 21:
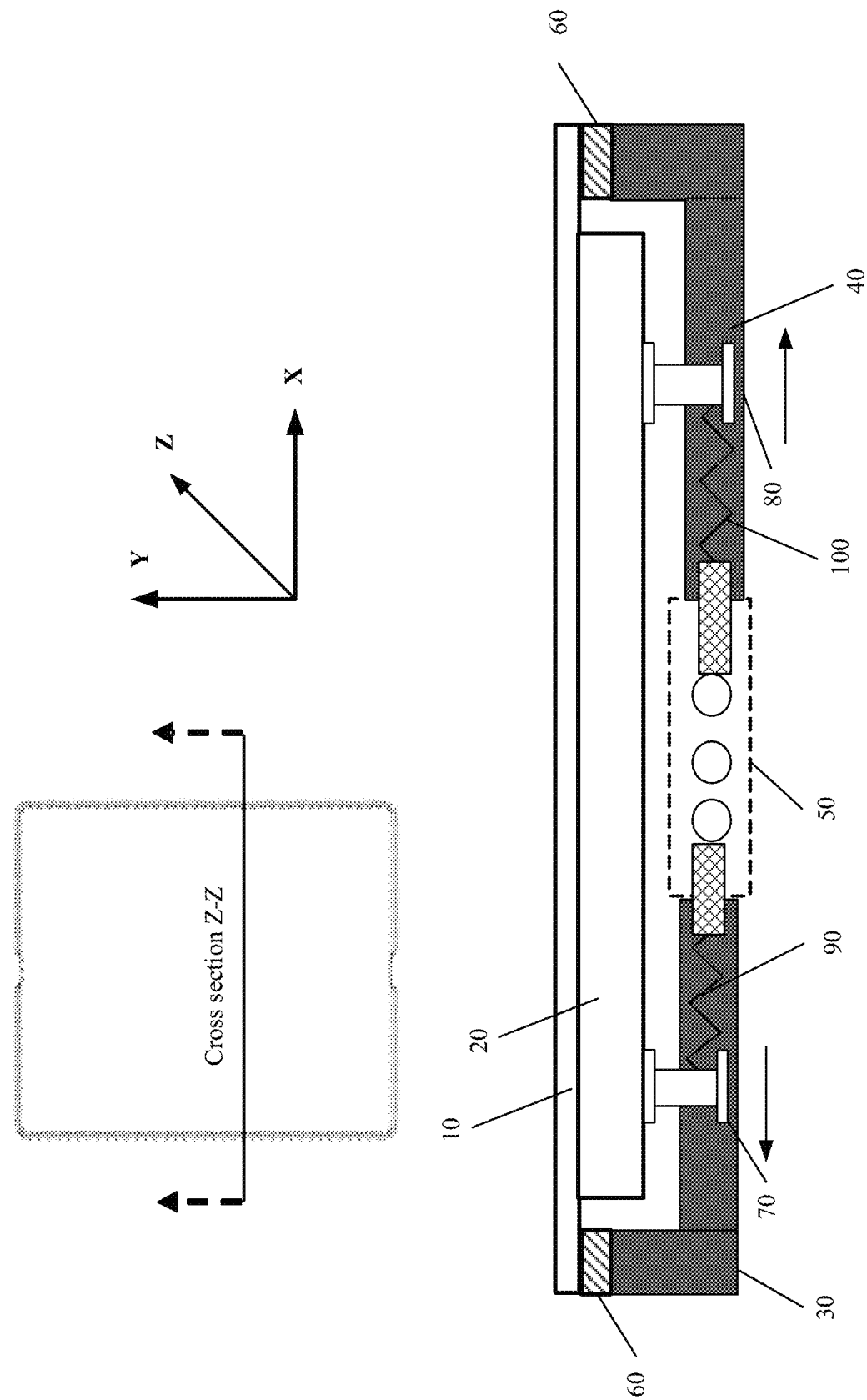
FIG. 21 is a schematic structural diagram of an example of a screen of an electronic device in an unfolded state according to this application.

Specifically, FIG. 21 is a schematic structural diagram obtained by cutting a screen of an electronic device in an unfolded state along a cross section Z-Z, where a Z-axis direction is a thickness direction of the electronic device. When the foldable screen is in a flattened state, the spring 90 may have a force for pushing the traction mechanism 70 toward an outer side of the foldable screen. Driven by the pushing force, the traction mechanism 70 may have, in an arrow direction shown in FIG. 20, a pulling force for pulling an innermost side of the display layer 20. For example, when the screen is in the unfolded state, the spring may have a pre-designed pushing force, so that when the screen is in the unfolded state, the spring 90 may have a force for pushing the traction mechanism 70 toward the outer side of the foldable screen. Similarly, the traction mechanism 80 may have, in an arrow direction shown in FIG. 21, a pulling force for pulling the innermost side of the display layer 20. Driven by the pulling forces of the traction mechanism 70 and the traction mechanism 80, the foldable display layer 20 can be enabled to be in the flattened state, thereby avoiding corrugation or arching that occurs when the foldable screen is in the flattened state.

It should be further understood that the "fixed connection" in this application may be understood as fastening of a component by using an adhesive, through glue dispersing or welding, or the like. The "connection in a slidable manner" may be understood as no fastening of a component in a plurality of manners such as through glue dispersing or welding. For example, a position-limiting component is connected to the housing in a slidable manner.

It should be further understood that: that an element is "fastened to" another element in the embodiments of this application may be understood as that the element may be directly or indirectly fastened to the another element. Similarly, that an element is "connected to" another element in the embodiments of this application may be understood as a direct connection or an indirect connection.

It should be further understood that, that a direction is "parallel to" or "perpendicular to" another direction in the embodiments of this application may be understood as "approximately parallel to" or "approximately perpendicular to". The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A foldable electronic device, comprising:
    a foldable screen, wherein the foldable screen comprises a plurality of layers of materials; and
    a first housing and a second housing that are connected by a folding shaft, and that include traction mechanisms that are disposed on the first housing and the second housing, respectively, wherein:
        an outermost layer of the foldable screen is fixedly connected to the first housing and the second housing,
        an innermost layer of the foldable screen is fixedly connected to the traction mechanisms,
        the traction mechanisms slide on the first housing and the second housing along a first direction and are configured to drag the layers of the foldable screen to be dislocated mutually, and
        the first direction is a direction perpendicular to the folding shaft.

2. The electronic device according to claim 1, wherein the foldable screen comprises a folding region, a first display region, and a second display region, the first display region and the second display region are located on two sides of the folding region, and the folding region corresponds to the folding shaft; and the electronic device further comprises:
    a first screen reinforcement sheet, wherein the first screen reinforcement sheet is fixedly connected to an innermost layer of the first display region, the first screen reinforcement sheet is configured to enhance strength of the first display region, and the traction mechanism on the first housing is fixedly connected to the first screen reinforcement sheet; and
    a second screen reinforcement sheet, wherein the second screen reinforcement sheet is fixedly connected to an innermost layer of the second display region, the second screen reinforcement sheet is configured to enhance strength of the second display region, and the traction mechanism on the second housing is fixedly connected to the second screen reinforcement sheet.

3. The electronic device according to claim 1, wherein the foldable screen comprises a folding region, a first display region, and a second display region, the first display region and the second display region are located on two sides of the folding region, the folding region corresponds to the folding shaft, a first screen reinforcement sheet is fixedly connected to the traction mechanism on the first housing, a second screen reinforcement sheet is fixedly connected to the traction mechanism on the second housing, the first screen reinforcement sheet is fixedly connected to an innermost layer of the first display region, the first screen reinforcement sheet is configured to enhance strength of the first display region, the second screen reinforcement sheet is fixedly connected to an innermost layer of the second display region, and the second screen reinforcement sheet is configured to enhance strength of the second display region.

4. The electronic device according to claim 2, wherein a screen strengthening sheet is fixedly connected to the innermost layer of the foldable screen, and the first screen reinforcement sheet and the second screen reinforcement sheet are fixedly connected to the screen strengthening sheet.

5. The electronic device according to claim 1, wherein clamping slots are disposed on the first housing and the second housing, the traction mechanism comprises a sliding block, the sliding block is disposed in the clamping slot, the sliding block slides in the clamping slot along the first direction, and the sliding block is fixedly connected to the innermost layer of the foldable screen, or the sliding block is fixedly connected to a first screen reinforcement sheet or a second screen reinforcement sheet.

6. The electronic device according to claim 1, wherein driving mechanisms are disposed on the first housing and the second housing, and the driving mechanisms are configured to drive the traction mechanisms to slide on the first housing and the second housing along the first direction.

7. The electronic device according to claim 6, wherein the driving mechanism comprises a shift lever, the traction mechanism comprises at least two shift sheets, the shift lever is located between any two shift sheets, and the shift lever is configured to push the traction mechanism to slide.

8. The electronic device according to claim 1, wherein the foldable screen comprises a cover layer and a display layer, the cover layer is the outermost layer of the foldable screen, the display layer is the innermost layer of the foldable screen, and both the cover layer and the display layer are made of a plurality of layers of materials.

9. The electronic device according to claim 3, wherein a screen strengthening sheet is fixedly connected to the innermost layer of the foldable screen, and the first screen reinforcement sheet and the second screen reinforcement sheet are fixedly connected to the screen strengthening sheet.

* * * * *